US011430479B2

(12) United States Patent
Komma et al.

(10) Patent No.: US 11,430,479 B2
(45) Date of Patent: Aug. 30, 2022

(54) OBJECTIVE LENS, OPTICAL HEAD DEVICE, OPTICAL INFORMATION DEVICE, AND OPTICAL DISK SYSTEM

(71) Applicant: Panasonic Intellectual Property Management Co., Ltd., Osaka (JP)

(72) Inventors: Yoshiaki Komma, Osaka (JP); Yasushi Kobayashi, Osaka (JP); Kazuhiro Minami, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/963,575

(22) PCT Filed: Oct. 23, 2019

(86) PCT No.: PCT/JP2019/041587
§ 371 (c)(1),
(2) Date: Jul. 21, 2020

(87) PCT Pub. No.: WO2020/110525
PCT Pub. Date: Jun. 4, 2020

(65) Prior Publication Data
US 2021/0304793 A1 Sep. 30, 2021

(30) Foreign Application Priority Data

Nov. 30, 2018 (JP) .............................. JP2018-224311

(51) Int. Cl.
*G11B 7/139* (2012.01)
*G11B 7/1374* (2012.01)
(Continued)

(52) U.S. Cl.
CPC ............ *G11B 7/1374* (2013.01); *G02B 13/18* (2013.01); *G11B 7/00455* (2013.01)

(58) Field of Classification Search
CPC ........ G11B 7/1353; G11B 2007/13722; G11B 7/135; G11B 7/1374; G11B 7/1359; G11B 7/139; G06B 9/001
(Continued)

(56) References Cited

U.S. PATENT DOCUMENTS 7,447,136 B2* 11/2008 Hama .................. G11B 7/1369
369/112.03
8,089,705 B2* 1/2012 Yamagata ............ G11B 7/1374
359/719
(Continued)

FOREIGN PATENT DOCUMENTS

JP   2003-279851   10/2003
JP   2008-293633   12/2008
(Continued)

OTHER PUBLICATIONS

International Search Report dated Jan. 7, 2020 in International (PCT) Application No. PCT/JP2019/041587 with English translation.

*Primary Examiner* — Nabil Z Hindi
(74) *Attorney, Agent, or Firm* — Wenderoth, Lind & Ponack, L.L.P.

(57) ABSTRACT

Provided is an objective lens which is used so that more information can be accumulated in a large-capacity optical disk and which has a further enhanced numerical aperture NA. The objective lens is a single lens having the numerical aperture NA and a refractive index n, and is configured so as to satisfy: NA≥0.91 and 1.61≤n<1.72.

15 Claims, 16 Drawing Sheets

(51) Int. Cl.
  *G02B 13/18* (2006.01)
  *G11B 7/0045* (2006.01)
(58) Field of Classification Search
  USPC ............. 369/112.23, 112.05, 112.07, 112.08, 369/44.23
  See application file for complete search history.

(56) References Cited

U.S. PATENT DOCUMENTS

| | | |
|---|---|---|
| 2008/0259775 A1 | 10/2008 | Yamagata et al. |
| 2010/0084785 A1 | 4/2010 | Masuhara et al. |
| 2012/0087227 A1* | 4/2012 | Ito .......................... G02B 3/04 369/112.23 |

FOREIGN PATENT DOCUMENTS

| | | |
|---|---|---|
| JP | 2010-86636 | 4/2010 |
| JP | 2013-206496 | 10/2013 |

* cited by examiner

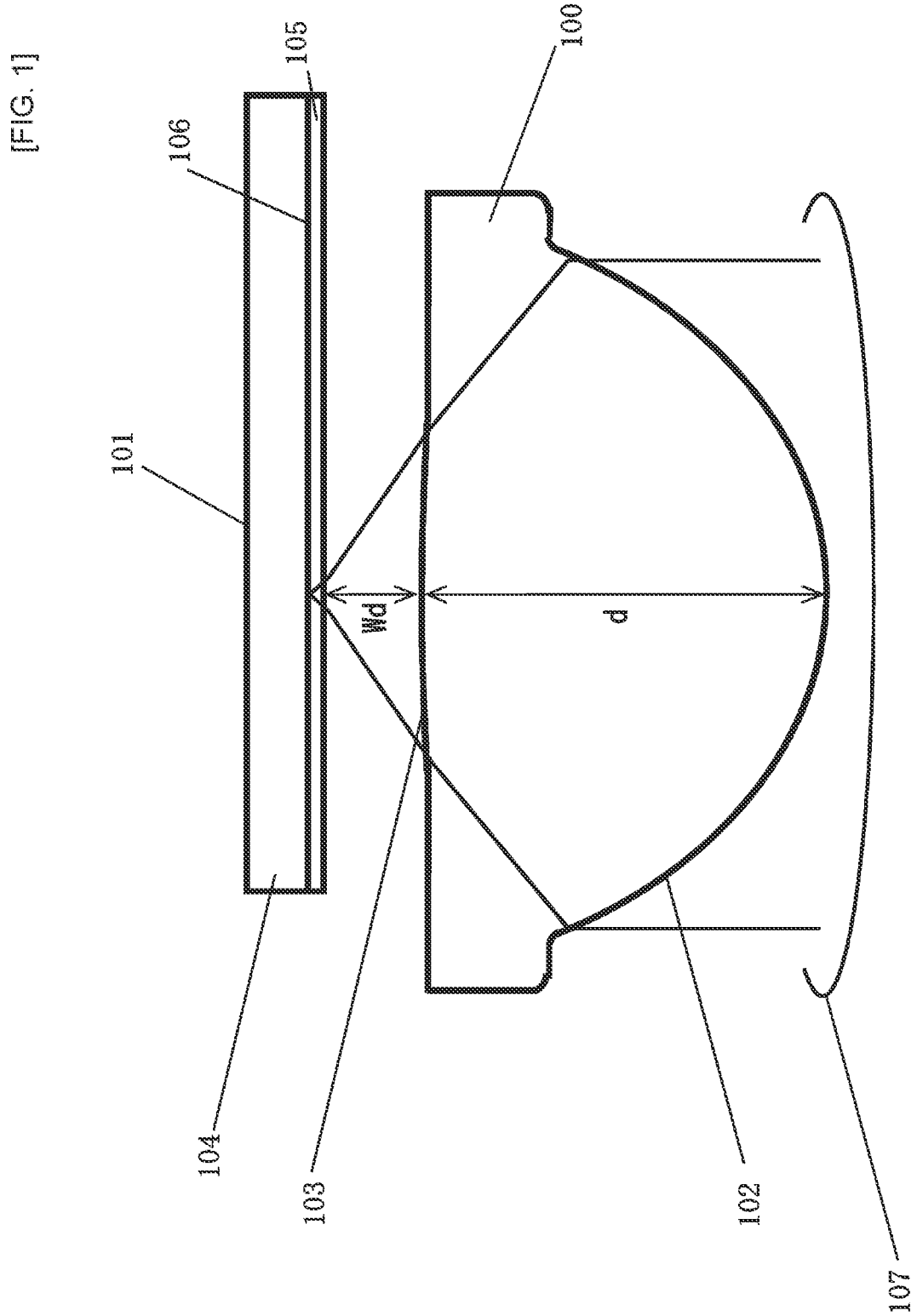
[FIG. 1]

[FIG. 2]
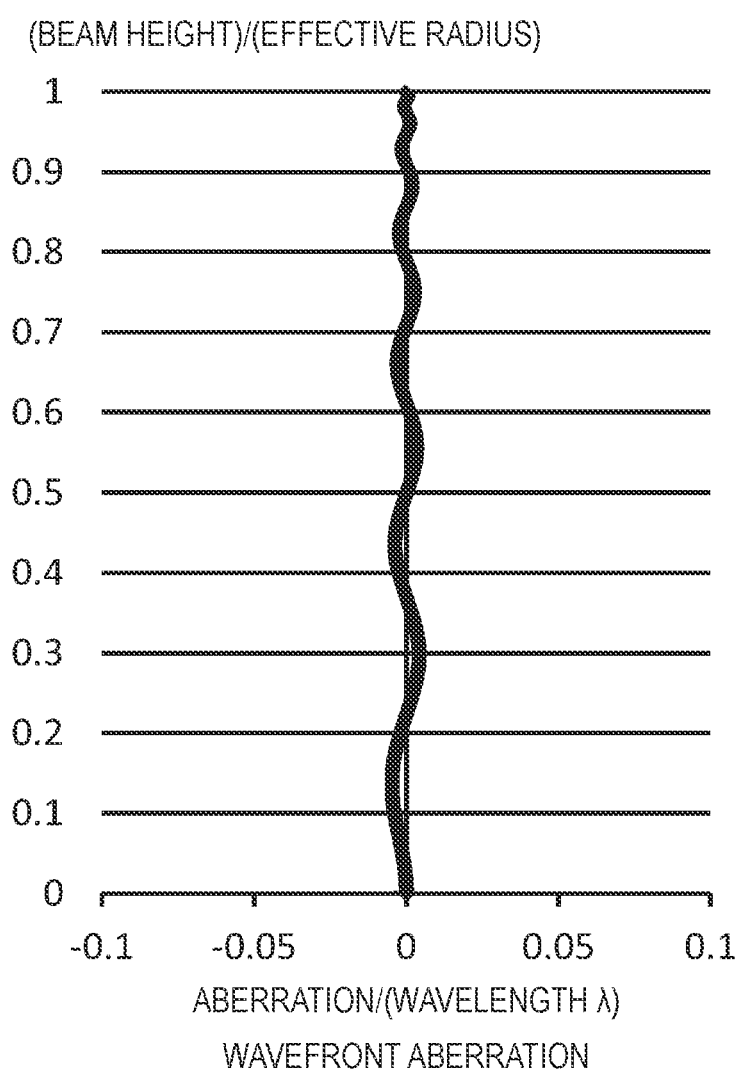

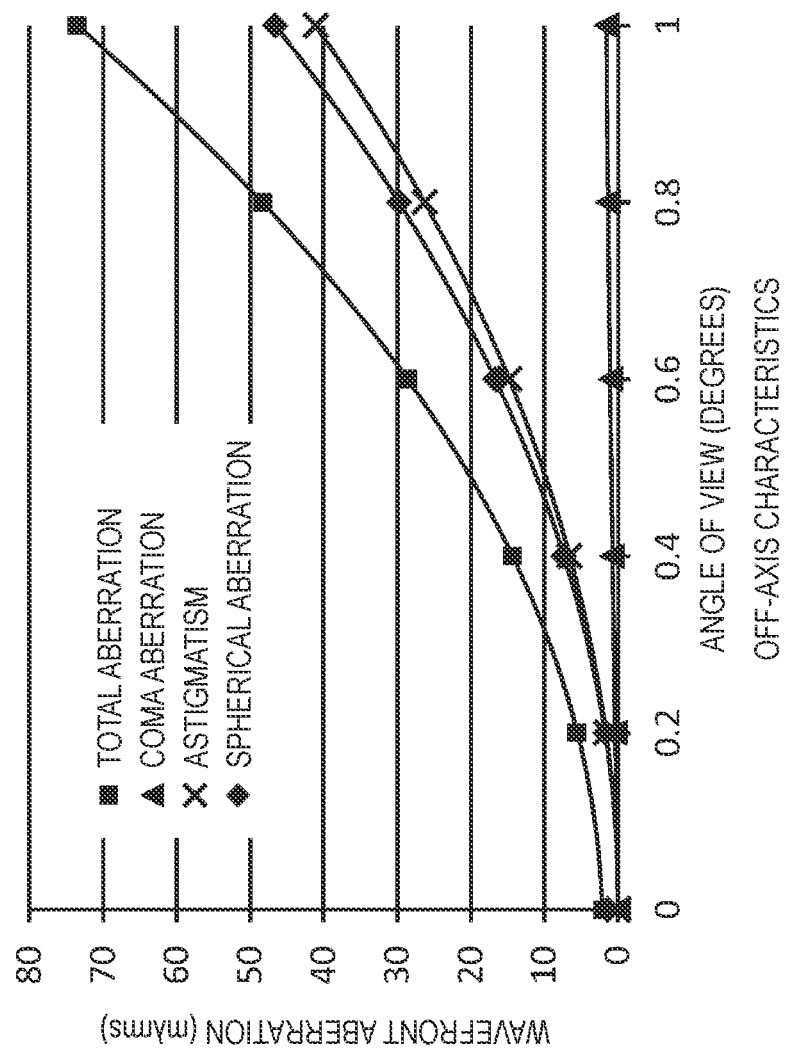
[FIG. 3]

[FIG. 4]
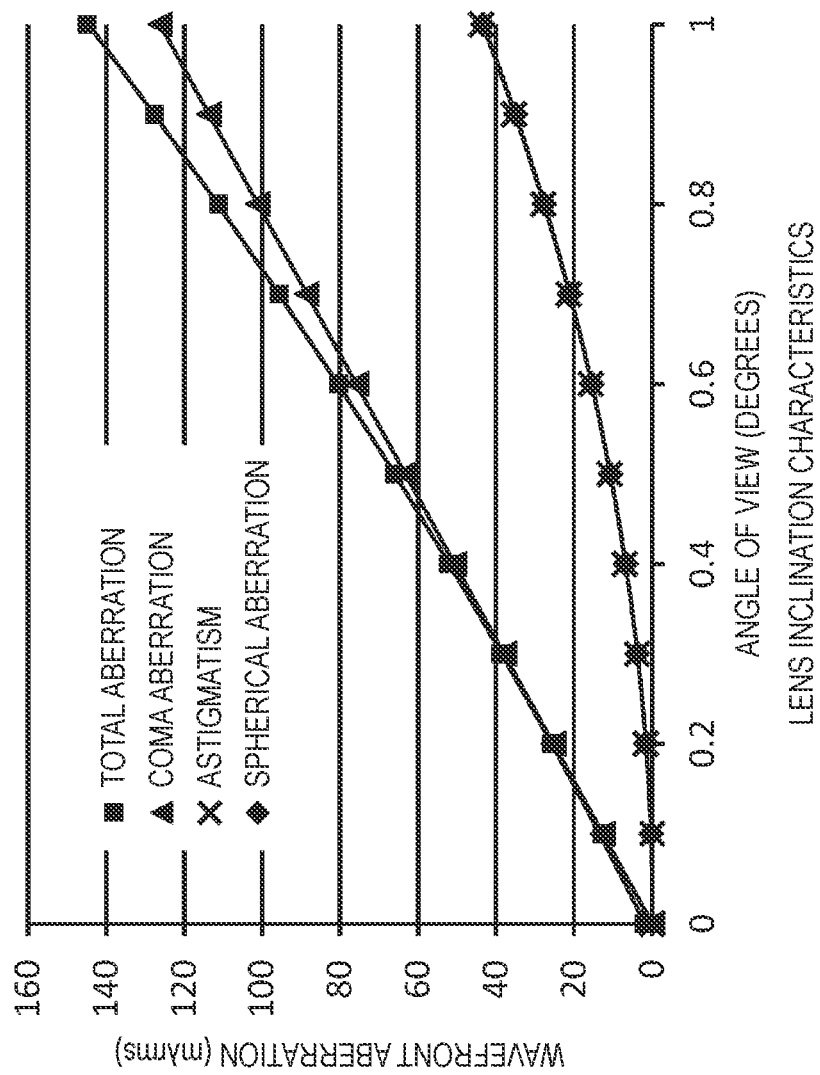

[FIG. 5]
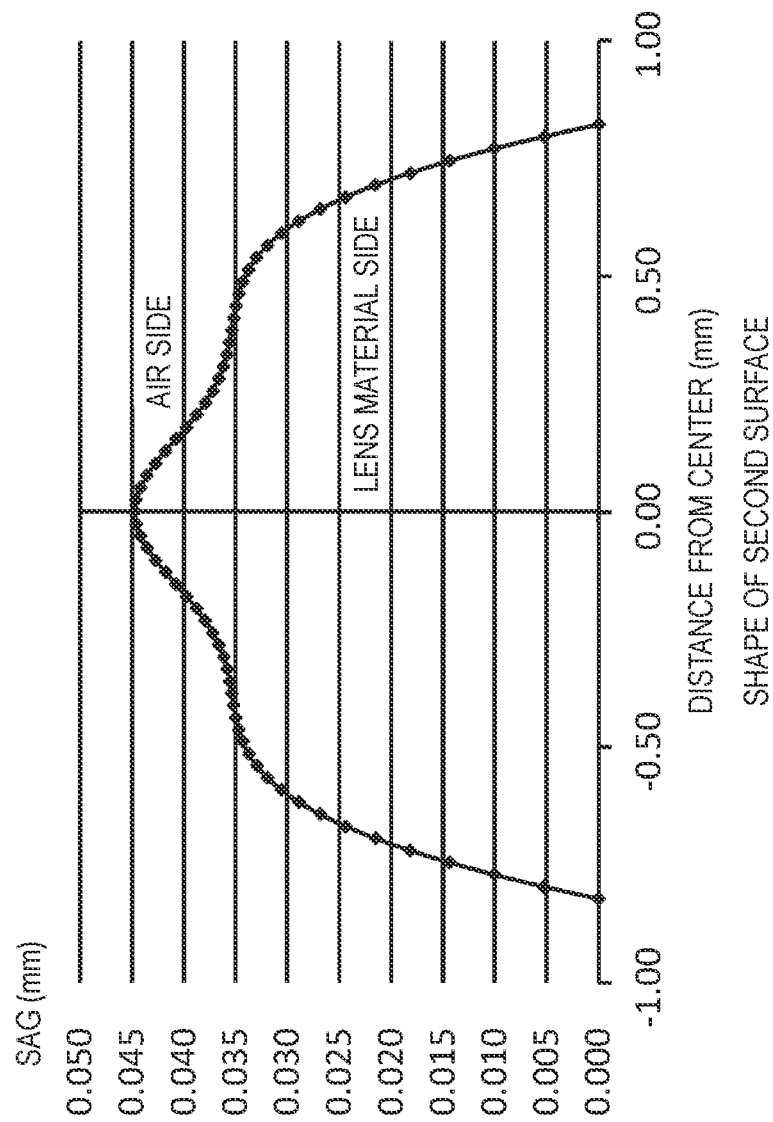

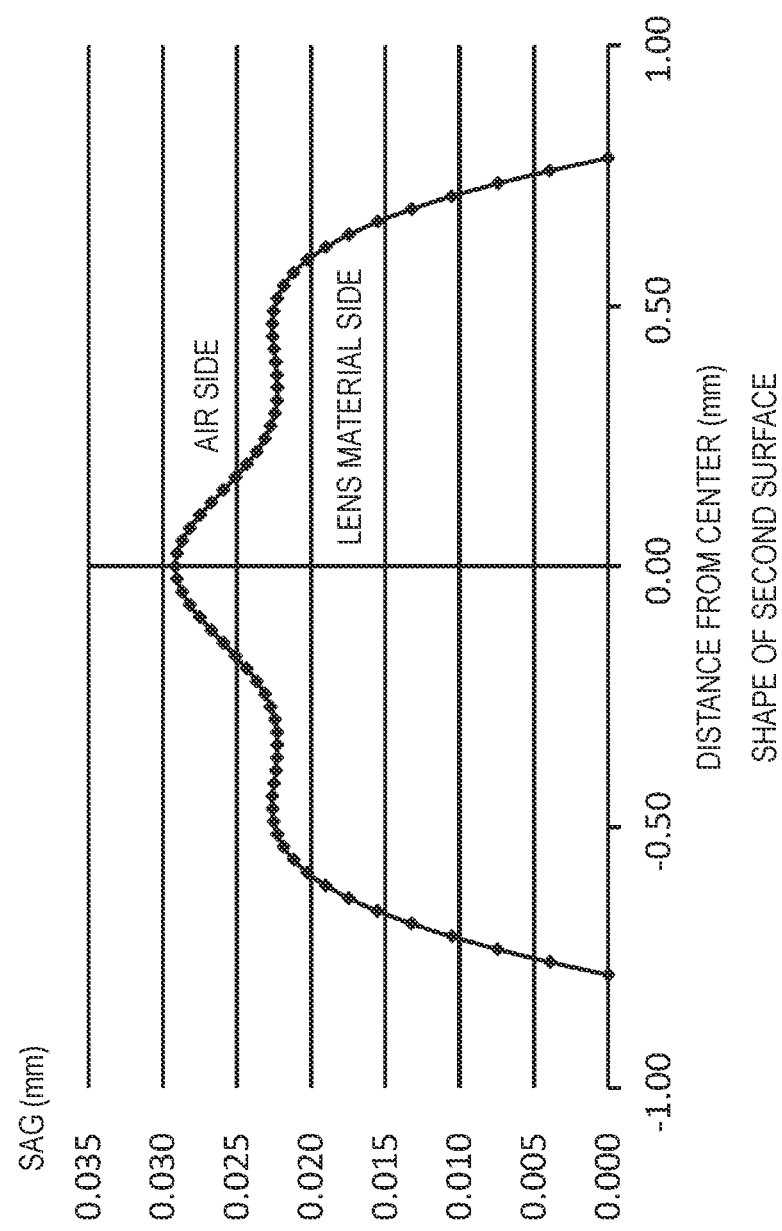
[FIG. 6]

[FIG. 7]
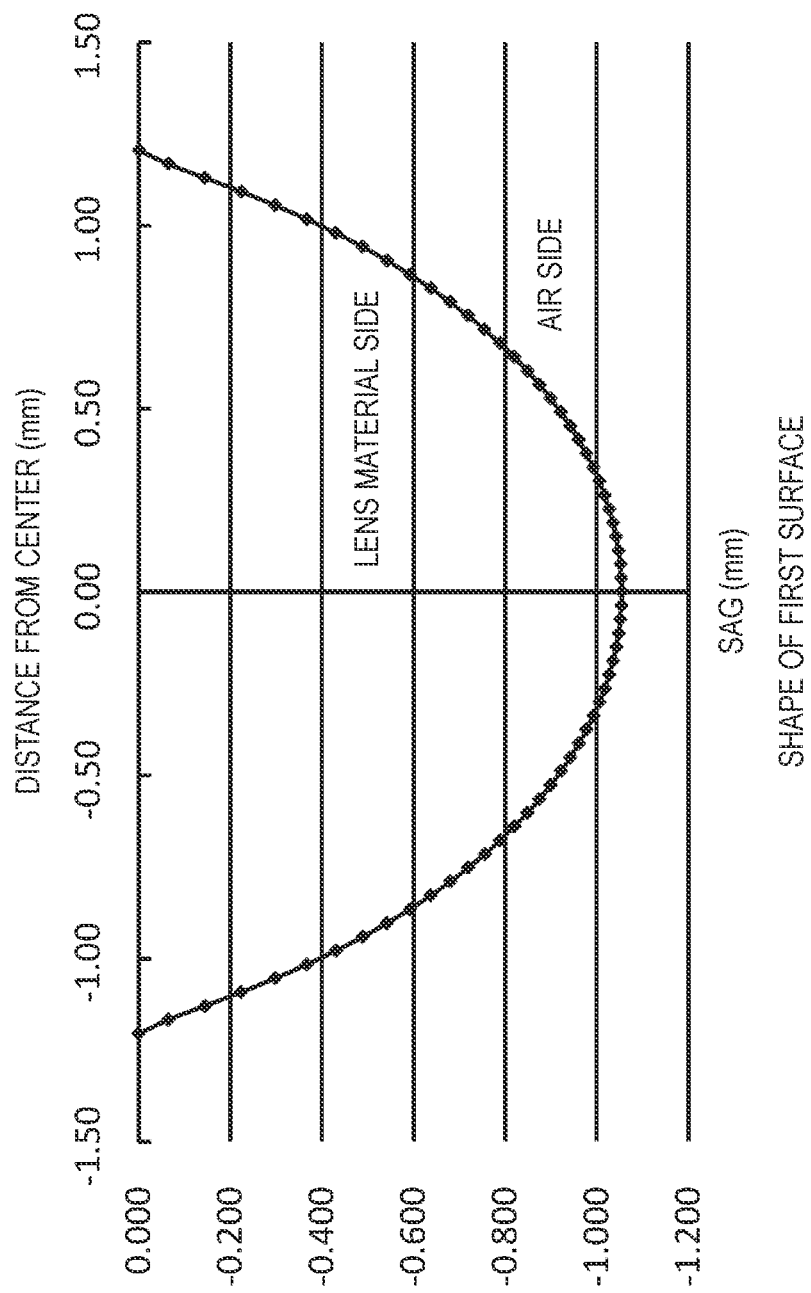

[FIG. 8]
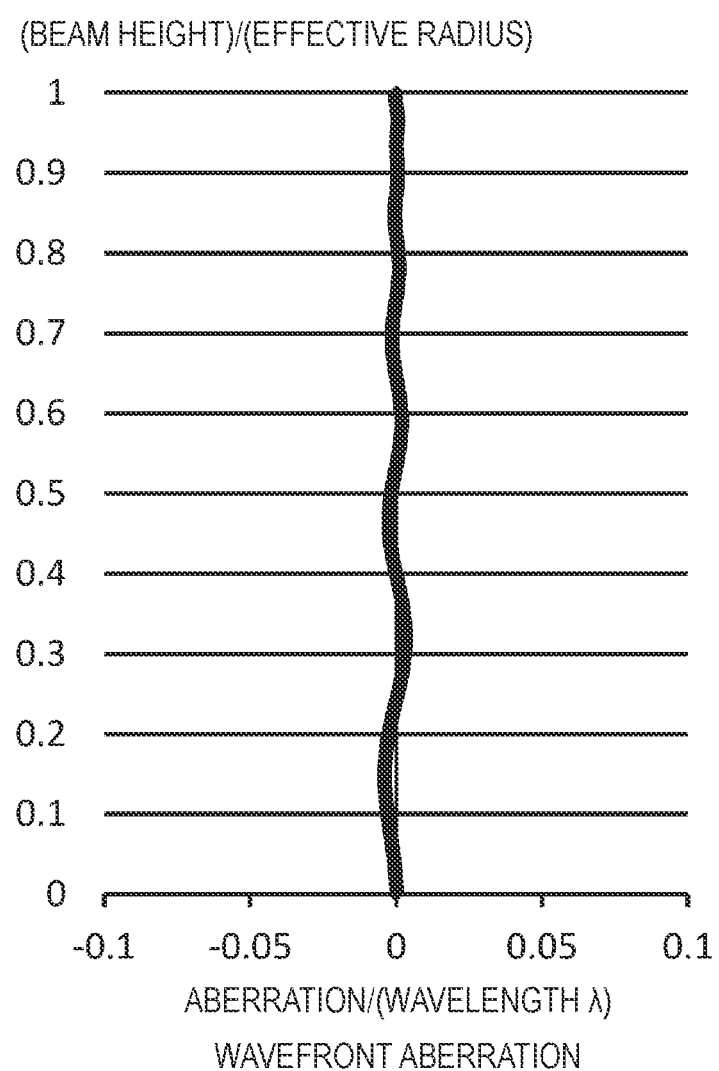

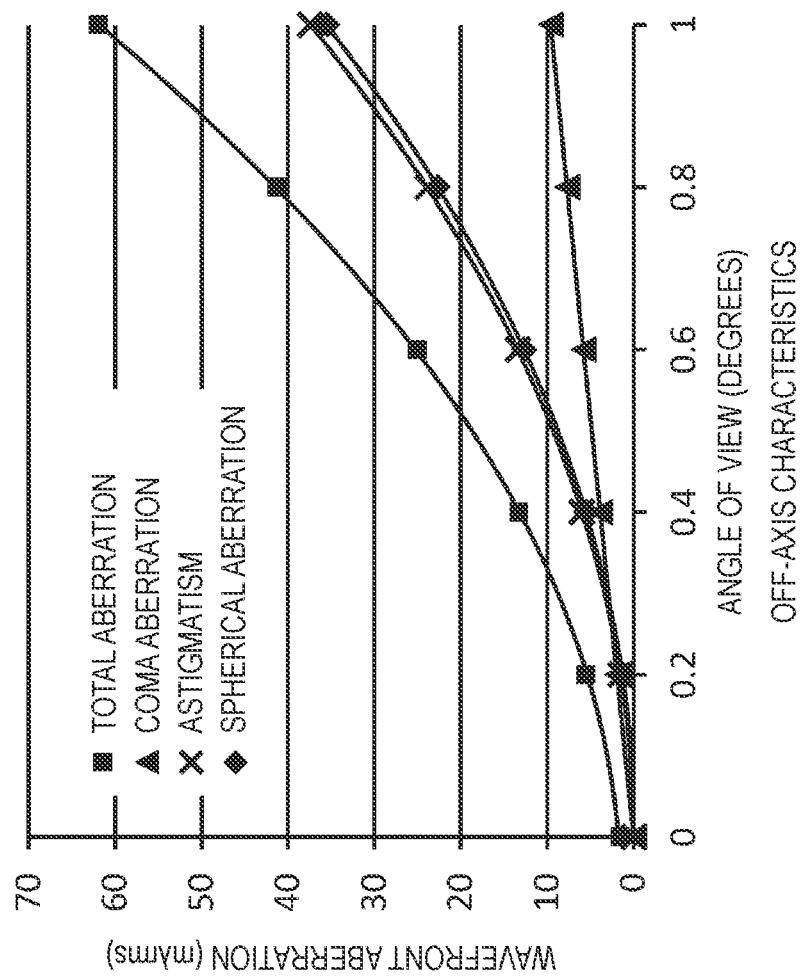
[FIG. 9]

[FIG. 10]
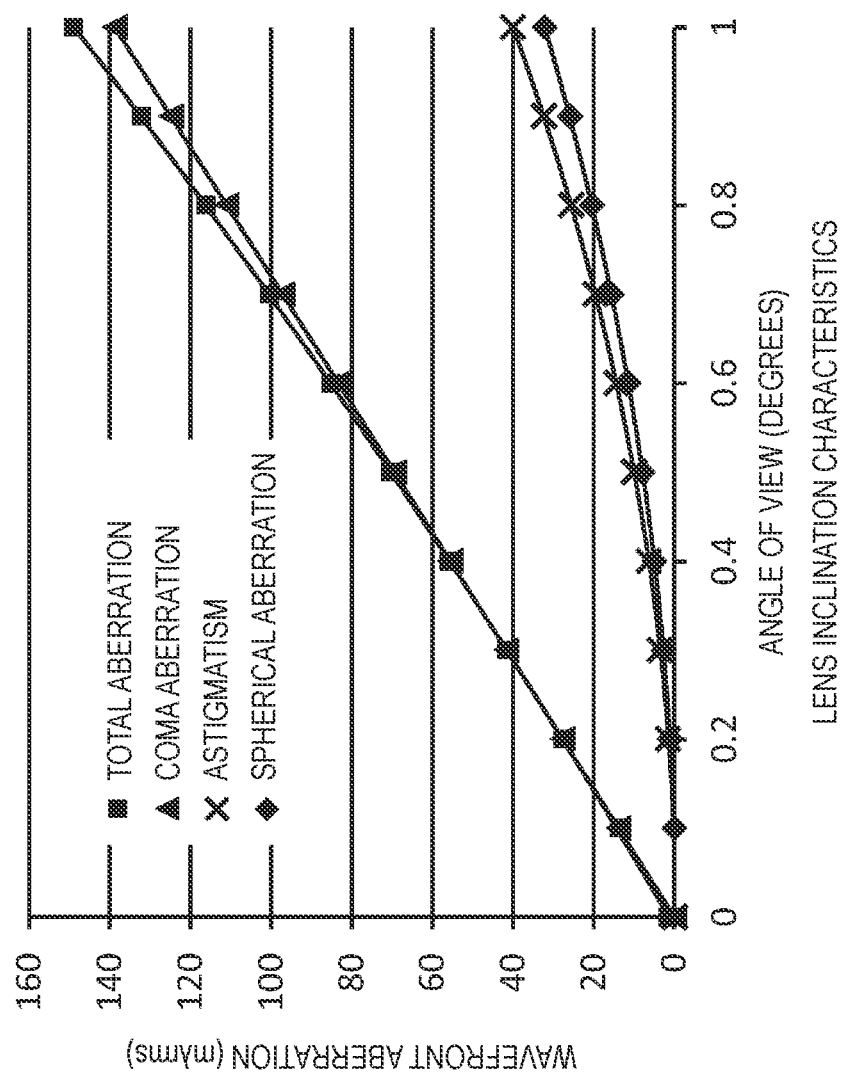

[FIG. 11]
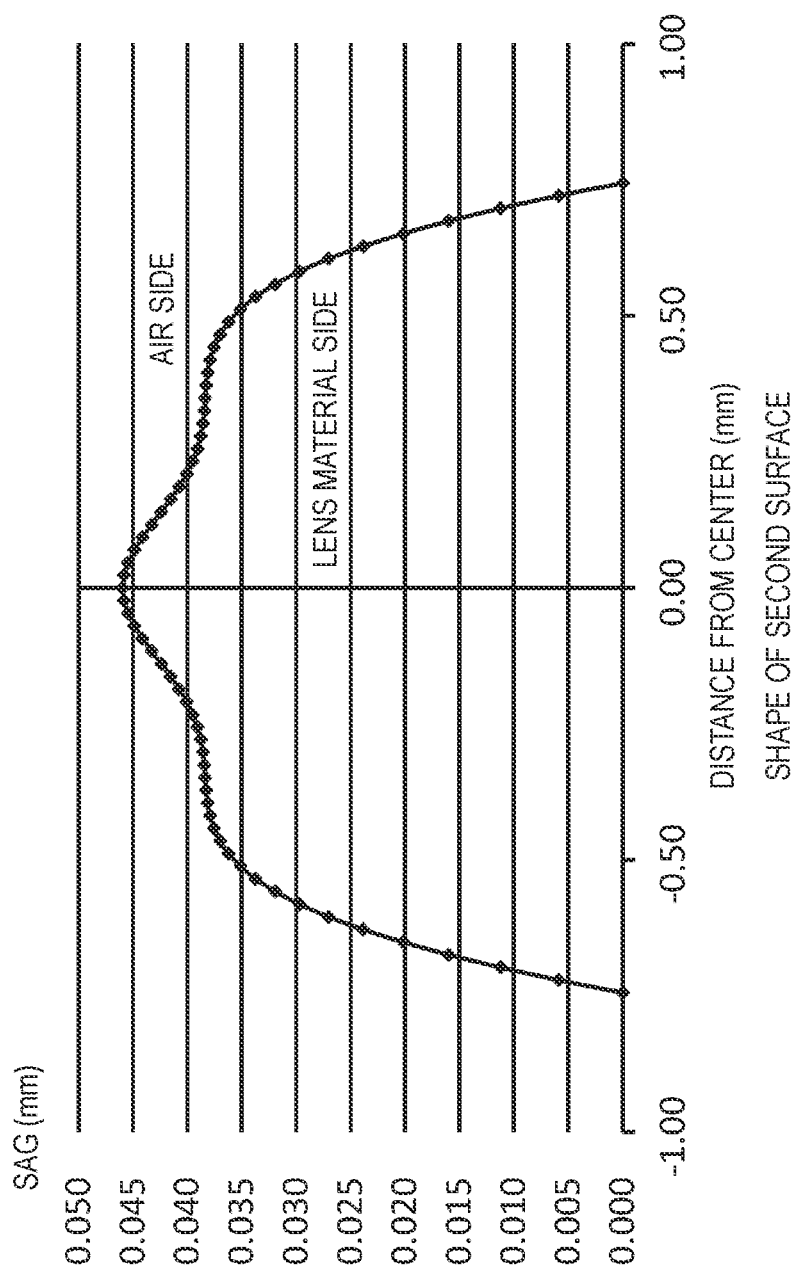

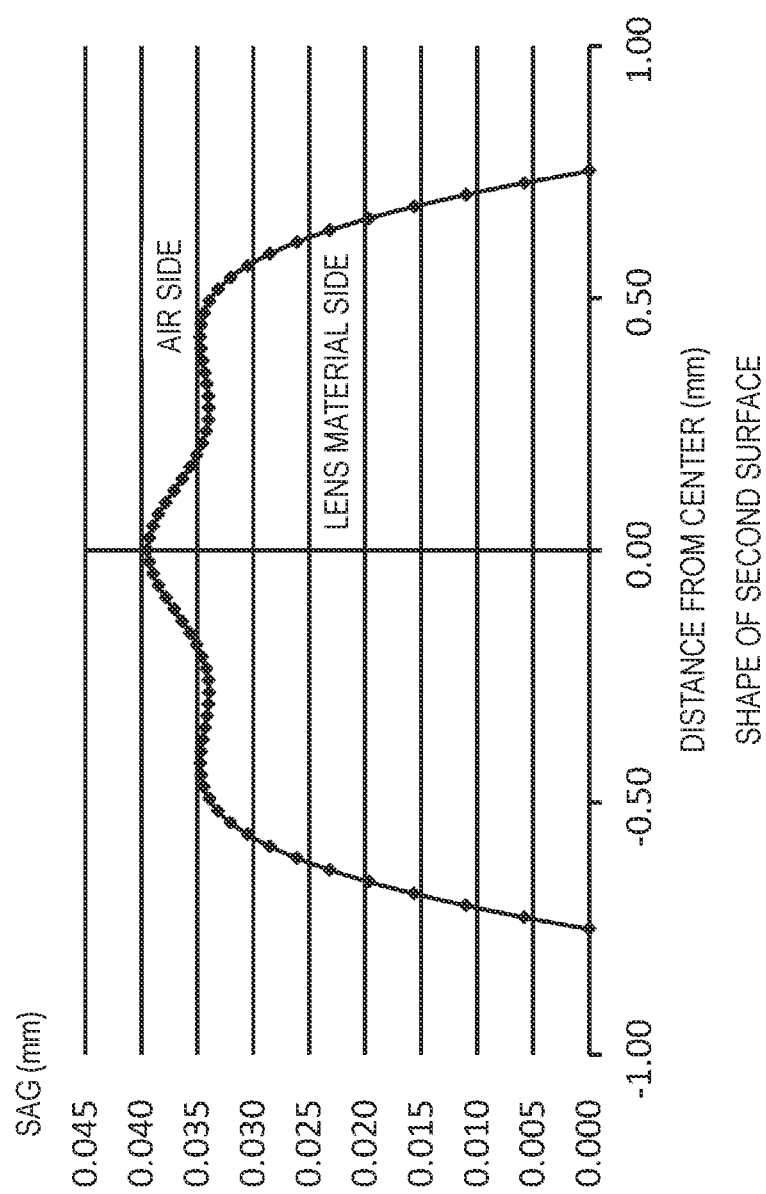
[FIG. 12]

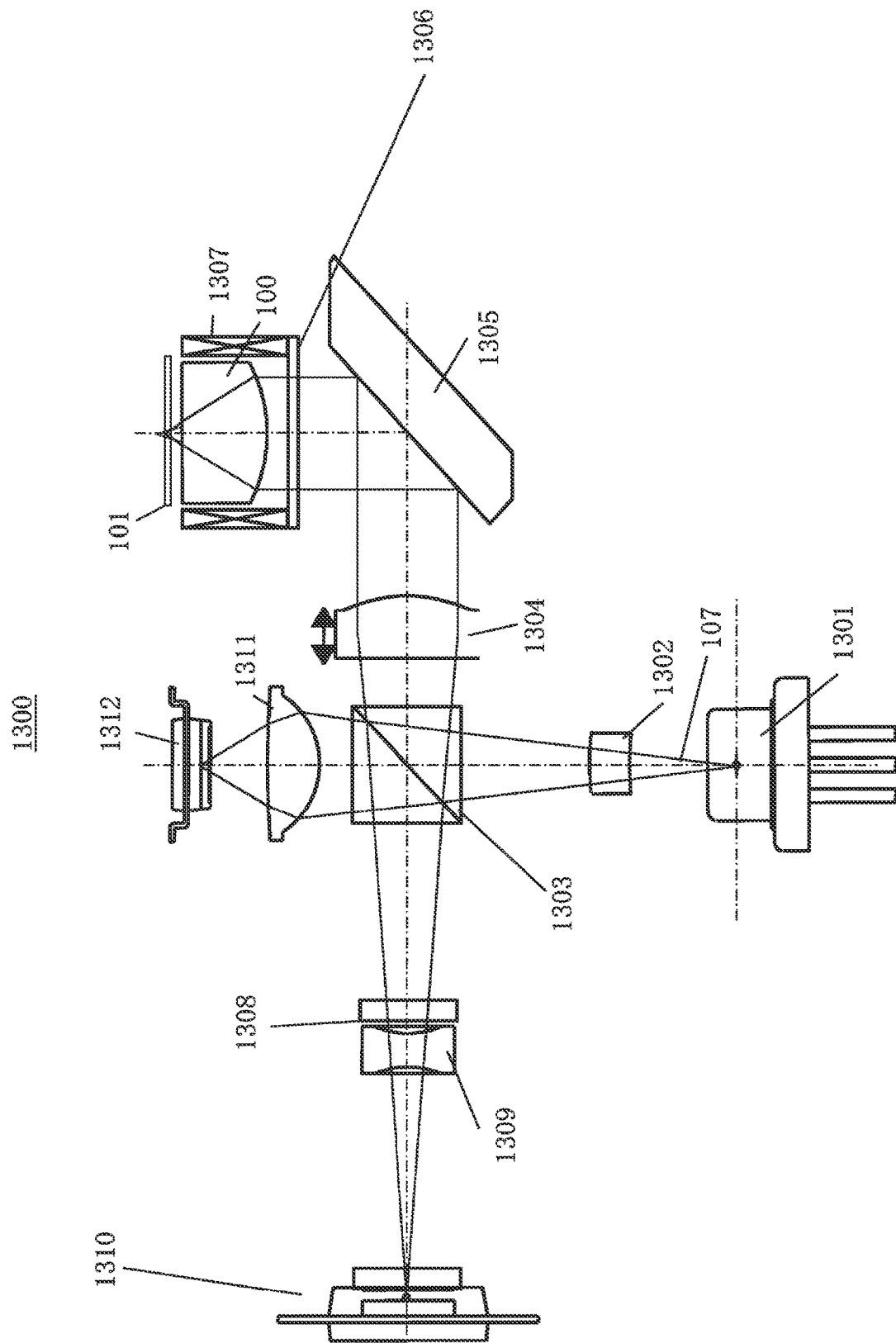
[FIG. 13]

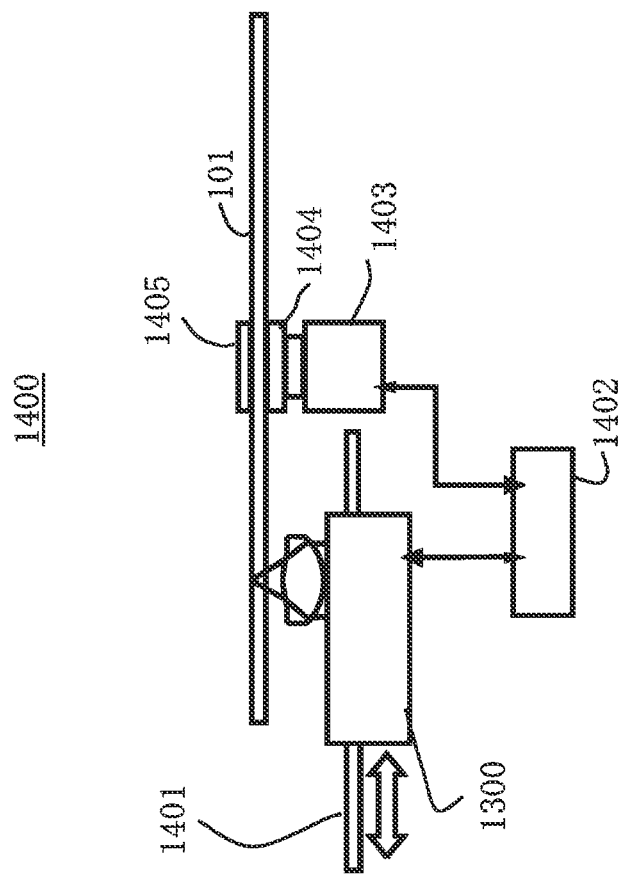

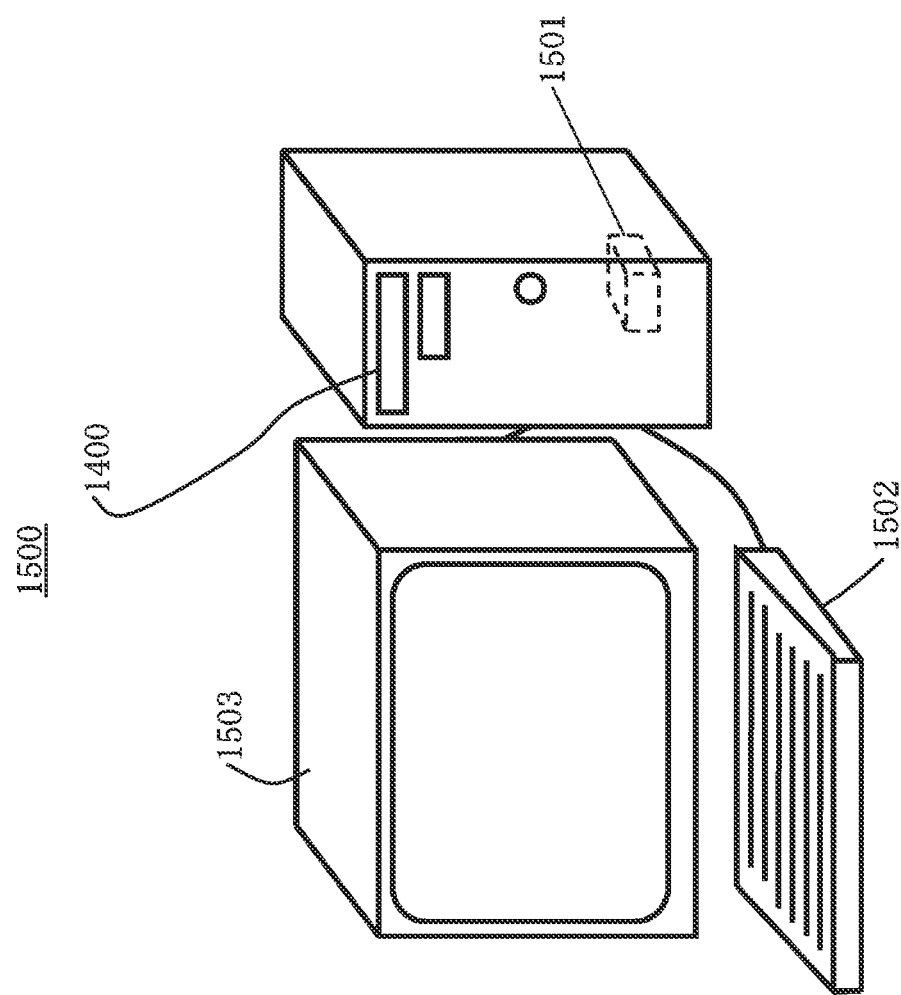

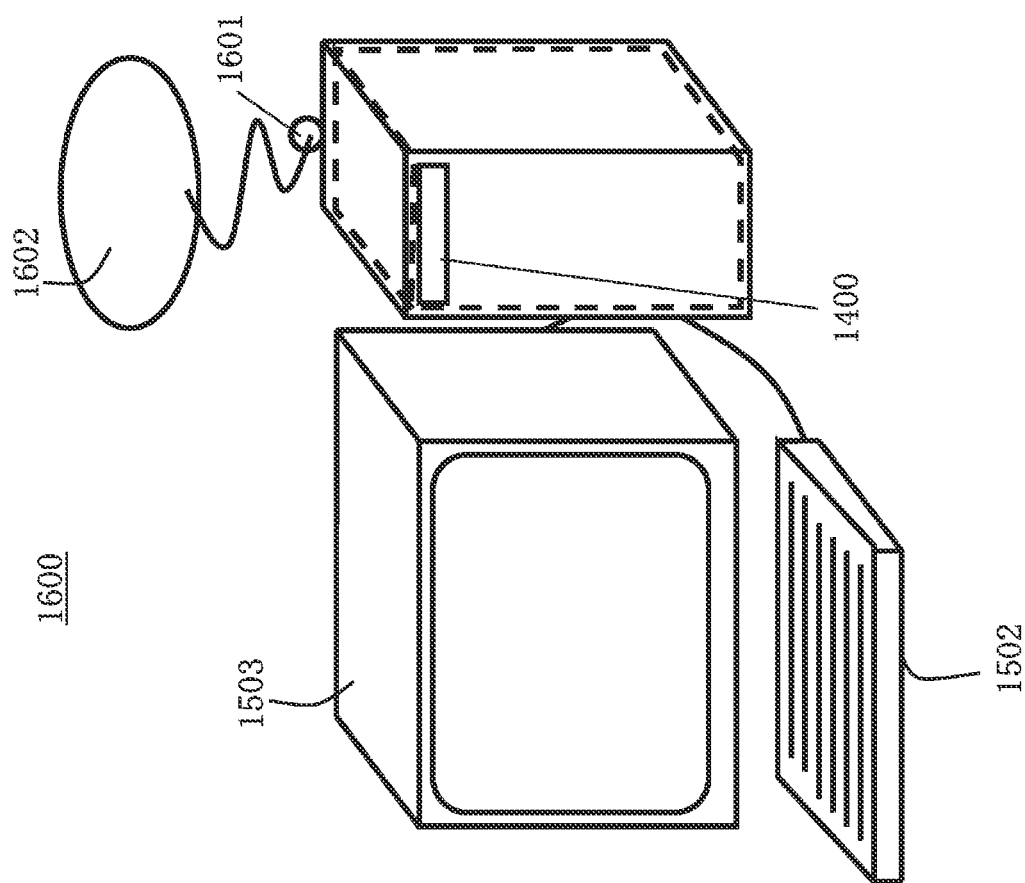

OBJECTIVE LENS, OPTICAL HEAD DEVICE, OPTICAL INFORMATION DEVICE, AND OPTICAL DISK SYSTEM

TECHNICAL FIELD

The present invention relates to an optical head device and an optical information device for recording/reproducing information on/from an optical information medium such as an optical disk or erasing information recorded on an optical information medium such as an optical disk, a recording/reproduction method in such an optical information device, an optical disk system to which things as mentioned above are applied, and an objective lens used in such an optical head device.

BACKGROUND ART

Optical memory technologies using an optical disk bearing pit-shaped patterns as a high-density/large-capacity storage medium have been put into practice while their uses expanded to digital audio disks, video disks, and document file disks and, furthermore, to data files. The function of successfully performing information recording and reproduction on and from an optical disk using a light beam narrowed so as to have a very small diameter is generally divided into a focusing function of forming a small spot corresponding to a diffraction limit, a focusing control (focus servo) a tracking control of an optical system, and detection of a pit signal (information signal).

In recent years, with advancement of optical system designing techniques and wavelength shortening of semiconductor lasers as light sources, the development of optical disks whose storage capacities are larger (densities are higher) than conventional ones has advanced. Increasing the optical-disk-side numerical aperture (hereinafter abbreviated as "NA") of a focusing optical system for narrowing a light beam so as to form a small spot on an optical disk is now being studied as one approach for increasing the density.

Compact disks (CDs) that can be said to be first-generation optical disks, for which infrared light (wavelength λ3: 780 to 820 nm) and an objective lens having an NA 0.45 are used, have a disk base material thickness 1.2 mm. DVDs as second-generation optical disks, for which red light (wavelength λ2: 630 to 680 nm) and an objective lens having an NA 0.6 are used, have a disk base material thickness 0.6 mm. Third-generation optical disks, for which blue light (wavelength λ1: 390 to 415 nm) and an objective lens having an NA 0.85 are used, have a disk base material thickness 0.1 mm. In this specification, the term "substrate thickness (or base material thickness)" means a thickness from a light beam incident surface of an optical disk (or information medium) to its information recording surface.

With the spread of the Internet, the amount of data produced over the world is continuing to increase. Optical disks as media for storing such data safely for a long time at a low power consumption are becoming increasingly important. It is therefore necessary to increase the capacity of optical disks and thereby make it possible to store more information in optical disks. To this end, it is desired to make the NA of the objective lens even larger. Examples in which an objective lens having a large NA value is realized by a single lens configuration have been proposed (e.g., refer to Patent documents 1 and 2).

CITATION LIST

Patent Literature

Patent document 1: JP-A-2003-279851
Patent document 2: JP-A-2008-293633
Patent document 3: JP-A-2013-206496

SUMMARY OF INVENTION

Technical Problem

However, in each of Patent documents 1 and 2, design examples that are disclosed as specific Examples have only an NA 0.85 and there is no statement relating to problems to be solved to realize an objective lens having an even larger NA value. Since no specific design example of an objective lens having a large NA value that exceeds 0.85 is disclosed, no problems to be solved are shown and even a proper refractive index is not clear.

Although Patent document 3 shows design examples with NAs that exceed 0.85, only one design example with an NA that exceeds 0.9 is shown in which the refractive index is equal to 1.59959. Although other example refractive index values are disclosed in design examples with NAs that are smaller than or equal to 0.9, in objective lenses having such large NA values a difference in NA has great influence on the designing, aberration characteristics, and difficulty of manufacture. It is therefore difficult to obtain guides to designing of a lens whose NA exceeds 0.9 from design examples of lenses whose NAs are smaller than or equal to 0.9. That is, Patent document 3 is not aware of an issue of a proper refractive index range that is necessary to obtain an NA that exceeds 0.9 (NA≥0.91) and, naturally, does not enable estimation of a proper refractive index range.

Solution to Problem

To solve the above problems, in the present invention, objective lenses, optical head devices, optical information device, and optical disk systems described below are configured:

(1) An objective lens which is a single lens having a numerical aperture NA and a refractive index n that satisfy NA≥0.91 and 1.61≤n<1.72.

(2) The objective lens according to item (1), in which the objective lens is a biconvex lens a sag amount of each surface of which always varies in the same direction from the optical axis toward a lens outer circumference of the biconvex lens.

(3) The objective lens according to item (1) or (2), in which a focal length f of the objective lens falls in a range of 1 to 1.3 mm.

(4) The objective lens according to any one of items (1) to (3), in which a working distance Wd of the objective lens falls in a range of 0.2 to 0.3 mm.

(5) The objective lens according to any one of items (1) to (4), in which NA 0.94 is satisfied.

(6) An optical head device characterized by comprising a laser light source configured to emit a light beam; the objective lens according to any one of items (1) to (5) configured to receive the light beam emitted from the laser light source and to focus the light beam into a small spot on a recording surface of an optical disk; and an optical detector formed of a photodetecting unit configured to receives a light beam reflected from the recording surface of the optical disk and to output an electrical signal according to a light quantity of the received light beam.

(7) An optical information device comprising the optical head device according to item (6); a motor configured to rotate the optical disk; and an electric circuit configured to receive a signal produced by the optical head device and to control and drive the motor, the objective lens, and the laser light source.

(8) An optical information device comprising an optical head device; a motor configured to rotate an optical disk; and an electric circuit configured to receive a signal produced by the optical head device and to control and drive the motor and an objective lens and a laser light source of the optical head device, in which the optical head device includes a first light source configured to emit a blue light beam having a wavelength λ1; the objective lens according to any one of items (1) to (5) configured to receive the light beam emitted from the first light source and to focus the light beam into a small spot on a recording surface of the optical disk through a base material layer having a base material thickness t1; an optical detector formed of a photodetecting unit configured to receive a light beam reflected from the recording surface of the optical disk and to output an electrical signal according to a light quantity of the received light beam; and an actuator configured to performs focusing so that the small spot is formed on the recording surface of the optical disk by driving the objective lens in an optical axis direction of the objective lens; in which the optical head device detects is configured to detect, from the optical detector, an electrical signal for detection of a focusing error signal; and the optical head device is configured to perform focusing so that the small spot is formed on the recording surface of the optical disk by driving the objective lens in the optical axis direction of the objective lens by the actuator.

(9) An optical disk system comprising the optical information device according to item (7) or (8); an input device or an input terminal configured to input of information; a computing device configured to perform computation based on information received from the input device or information reproduced from the optical information device; and an output apparatus or an output terminal configured to display or output of the information received from the input device, the information reproduced from the optical information device, or a result of the computation by the computing device.

(10) An optical disk system comprising the optical information device according to item (7) or (8); and an information-to-image decoder configured to convert an information signal acquired from the optical information device into an image.

(11) An optical disk system comprising the optical information device according to item (7) or (8); and an image-to-information encoder configured to convert image information into information to be recorded by the optical information device.

(12) An optical disk system comprising the optical information device according to item (7) or (8); and an input/output terminal for exchange of information with the outside.

Advantageous Effects of Invention

The objective lenses according to embodiments of the invention realize recording on and reproduction from a high-density optical disk.

BRIEF DESCRIPTION OF DRAWINGS

FIG. 1 is a diagram showing the configuration of an objective lens according to a first embodiment of the present invention.

FIG. 2 is a diagram showing the wavefront aberration of Example 1.

FIG. 3 is a diagram showing the off-axis characteristics of Example 1.

FIG. 4 is a diagram showing the lens inclination characteristics of an objective lens of Example 1.

FIG. 5 is a diagram showing a sag shape of the second surface of an objective lens of Example 2.

FIG. 6 is a diagram showing a sag shape of the second surface of an objective lens of Referential Example 1.

FIG. 7 is a diagram showing a sag shape of the first surface of an objective lens of Example 3.

FIG. 8 is a diagram showing the wavefront aberration of Example 4.

FIG. 9 is a diagram showing the off-axis characteristics of Example 4.

FIG. 10 is a diagram showing the lens inclination characteristics of an objective lens of Example 4.

FIG. 11 is a diagram showing a sag shape of the second surface of an objective lens of Example 5.

FIG. 12 is a diagram showing a sag shape of the second surface of an objective lens of Referential Example 4.

FIG. 13 is a diagram showing the configuration of an optical head device 1300 according to a second embodiment of the invention.

FIG. 14 is a diagram showing the configuration of an optical information device according to a third embodiment of the invention.

FIG. 15 is a diagram showing the configuration of an optical disk system according to a fourth embodiment of the invention.

FIG. 16 is a diagram showing the configuration of an optical disk system according to a fifth embodiment of the invention.

DESCRIPTION OF EMBODIMENTS

Embodiments will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. This is to prevent the following description from becoming unnecessarily redundant and thereby facilitate understanding of those skilled in the art.

The following description and the accompanying drawings are provided to allow those skilled in the art to understand the disclosure sufficiently and are not intended to restrict the subject matter set forth in the claims.

Embodiment 1

To increase the NA of an objective lens, it is necessary to increase the light refraction angle of an outer circumferential portion that is distant from the optical axis. To this end, it is desirable to make the refractive index n of the lens material of the objective lens such as glass or a resin. However, through actual designing of single objective lenses whose NAs exceed 0.9, we have found that it is not true that the refractive index n should be as large as possible, that is, the refractive index n has a proper range.

FIG. 1 is a diagram showing the configuration of an objective lens 100 according to a first embodiment of the invention. As shown in FIG. 1, the objective lens 100 has a first surface 102 which receives an incident light beam 107 and a second surface 103 which is opposed to the first surface 102 and is disposed on the side that is closer to an optical disk 101. The optical disk 101 has a substrate 104, a base material layer 105, and an information recording surface 106 which is an interface between the substrate 104 and the base material layer 105. The light beam 107 shines on the first surface 102 of the objective lens 100, passes through the second surface 103, and is focused on the information recording surface 106 of the optical disk 101. Here the distance between the second surface 103 and the base material layer 105 of the optical disk 101 in a state that the light beam 107 is focused on the information recording surface 106 is referred to as a working distance (hereinafter represented by Wd). The interval between the first surface 102 and the second surface 103 of the objective lens 100 on the optical axis is represented by d.

EXAMPLES

The specific embodiment of the present invention will be described in more detail using Examples. The Examples employ, in common, symbols that will be below. Optical disks used in experiments were parallel plates, the design wavelength λ was 405 nm, the optical disk thickness was about 0.08 mm, and a main refractive index was 1.623918.

f: focal length of the objective lens;
NA: NA of the objective lens;
R1: radius of curvature of the first surface of the objective lens;
R2: radius of curvature of the second surface of the objective lens;
d: lens thickness of the objective lens;
n: refractive index of the objective lens; and
Wd: distance from the second surface of the objective lens to the optical disk.

The NA and the refractive index are unitless and the unit of the other parameters is mm.

The shape of an aspherical shape is given by the following Formula 1:

[Formula 1]

$$X = \frac{C_j h^2}{1+\sqrt{1-(1+k_j)C_j^2 h^2}} + \sum A_{j,n} h^n \quad \text{(Formula 1)}$$

The meanings of the respective symbols are as follows:
X: distance, from the tangential plane to the aspherical surface at its top, of a point on the aspherical surface having a height h from the optical axis;
h: height from the optical axis;
$C_j$: curvature at the top of a jth aspherical surface of the objective lens;
$k_j$: conic constant of the jth surface of the objective lens; and
$A_{j,n}$: nth-order aspherical coefficient of the jth surface of the objective lens, where j=1, 2.

Example 1

Specific numerical values of an objective lens of Example 1 are as follows. Example 1 is an example in which a single lens having a focal length f=1.309, a numerical aperture NA=0.92, and a working distance Wd=0.2603 was designed with the refractive index n of a lens material being equal to 1.6239179286.

f=1.309
NA=0.92
R1=0.9478402
R2=−1.396387
d=1.88232
n=1.6239179286
Wd=0.2603
$K_1$=−0.6129
$A_{1,4}$=0.032330925
$A_{1,6}$=−0.055965387
$A_{1,8}$=0.2934815
$A_{1,10}$=−0.57827049
$A_{1,12}$=0.3927477
$A_{1,14}$=0.47990334
$A_{1,16}$=−0.94535234
$A_{1,18}$=0.39255542
$A_{1,20}$=−0.034679428
$A_{1,22}$=0.35663912
$A_{1,24}$=−0.31441135
$A_{1,26}$=−0.14052526
$A_{1,28}$=0.24739738
$A_{1,30}$=−0.083565112
$A_{1,32}$=0.0049397773
$A_{1,34}$=−0.00015933301
$A_{1,36}$=−0.0002234926
$A_{1,38}$=−5.0255976e-05,
where e-05 means the −5th power of 10.
$A_{1,40}$=0.00016990175
$K_2$=−32.65169
$A_{2,4}$=1.5718168
$A_{2,6}$=−9.1516081
$A_{2,8}$=32.322227
$A_{2,10}$=−71.479196
$A_{2,12}$=77.554531
$A_{2,14}$=26.928859
$A_{2,16}$=−196.41859
$A_{2,18}$=233.56162
$A_{2,20}$=−94.329769
$A_{2,22}$=−4.5393102
$A_{2,24}$=−15.335899
$A_{2,26}$=16.596486
$A_{2,28}$=3.3163821
$A_{2,30}$=6.263965
$A_{2,32}$=−2.0316557
$A_{2,34}$=0.034825839
$A_{2,36}$=−4.9330315
$A_{2,38}$=−9.5297525
$A_{2,40}$=9.7816725.

FIG. 2 is a diagram showing the wavefront aberration of this Example. The aberration falls within 9 mλ (λ: wavelength) in terms of the PV value and within 2.1 mλ in terms of the rms value of total aberration, which is a very good aberration characteristic.

FIG. 3 is a diagram showing the off-axis characteristics of this Example. Total aberration is within 30 mλrms at an angle of view 0.6°, which raises no practical problems.

FIG. 4 is a diagram showing how the wavefront aberration varies when only the objective lens is inclined, that is, the lens inclination characteristics of the objective lens. Astigmatism that occurs when coma aberration caused by inclination of an optical disk is canceled by inclining the objective lens is within 10 mλ if the comma aberration is smaller than about 60 mλ.

Aberration calculation were performed with assumptions that the base material thickness from the optical disk surface to the recording surface was 0.078 mm, the refractive index of the base material was 1.6173566451, and light incident on the objective lens is slightly convergent light for the purpose of minimizing third order spherical aberration in a state of no inclination.

In Example 1, sufficient corrections are made of the aberrations for an oblique light beam, not to mention the on-axis aberrations. Example 1 is also suitable for a case of correcting coma aberration caused by inclination of an optical disk by inclining the objective lens instead of the entire optical head. The inclination angle of a steepest portion of the first surface is 64.7°, which can be said to be within such a range that glass shaping can be performed in an industrial sense by producing a die by working.

In many cases, an aperture is employed for an objective lens for an optical disk to use a numerical aperture NA value as designed. For example, a correct numerical aperture NA is realized by setting the beam diameter of a light beam 107 incident on the objective lens 100 at a desired value by, for example, disposing an aperture (not shown in the drawing) on the side of incidence of an approximately parallel light beam (bottom side in FIG. 1) of the objective lens 100. In doing so, an allowance needs to be set because errors from a design occur in the positional relationship between the aperture and the objective lens 100. It is sufficient that the allowance be set at 20 μm. To set an allowance 20 μm in the left-right direction and the front-rear direction in FIG. 1 for an objective lens having a focal length of about 1 mm, since 0.02 mm/NA≅0.02, it is desirable to perform designing so that at least on-axis aberrations become small in a numerical aperture range whose upper limit has a margin of about 0.02. In this Example, it is expected to perform designing so that the on-axis aberrations can be suppressed in an NA range having an upper limit 0.92+0.02=0.94 and to restrict the NA to 0.9 to 0.92 by an aperture in installing the objective lens in an optical pickup.

Example 2

Specific numerical values of an objective lens of Example 2 are as follows. Example 2 is a design example in which the refractive index n of a lens material was set even larger than in Example 1. Designing was performed setting the refractive index n at 1.710000. As in Example 1, a single lens having a numerical aperture NA=0.92 and a working distance Wd=0.2603 was designed. Likewise, the focal length f=1.299 was approximately the same.

f=1.299
NA=0.92
R1=1.018122
R2=-2.342684
d=1.866571
n=1.710000
Wd=0.2603
K1=-0.5907896
A1,4=0.029373894
A1,6=-0.05957560
A1,8=0.29429474
A1,10=-0.58184186
A1,12=0.39011067
A1,14=0.48115837
A1,16=-0.94380807
A1,18=0.39156078
A1,20=-0.035160214
A1,22=0.35700693
A1,24=-0.31507323
A1,26=-0.14056908
A1,28=0.24748702
A1,30=-0.083460424
A1,32=0.0055100959
A1,34=-0.00039080295
A1,36=-0.00037894571
A1,38=-0.00019212844
A1,40=0.00030159435
K2=-81.35706
A2,4=1.4407636
A2,6=-9.0852959
A2,8=32.349655
A2,10=-71.42993
A2,12=77.671948
A2,14=26.954773
A2,16=-196.4673
A2,18=233.06062
A2,20=-96.538054
A2,22=-2.4015789
A2,24=-12.305189
A2,26=17.460283
A2,28=3.0227737
A2,30=2.9785866
A2,32=-6.1157086
A2,34=-4.0736054
A2,36=-2.5063237
A2,38=1.1701339
A2,40=7.1032384

Also in Example 2, the wavefront aberration falls within 11 mλ (λ: wavelength) in terms of the PV value and within 2.4 mλ in terms of the rms value of total aberration, which is a very good aberration characteristic. The off-axis characteristics, the angle-of-view characteristic, and the lens inclination characteristics of Example 2 are equivalent to those of Example 1 though the former are not shown in any drawings.

FIG. 5 is a diagram showing a sag shape of the second surface of the objective lens. In FIG. 5, the bottom side part corresponds to a lens constituent material such as glass and the top side part corresponds to air. In the second surface of the objective lens used in Example 2, the sag amount varies in such a manner as to always decrease as the position goes from the optical axis to the outer circumferential side. In other words, the differential coefficient of the sag amount with respect to the radial position (i.e., the height h from the optical axis) is always negative, that is, the distance from the first surface always decreases with the radial position. Example 1 has the same characteristic though no reference was made to it. The objective lenses of Example 1 and Example 2 are biconvex lenses. The sag in FIG. 5 has the same meaning as X in Formula 1, that is, the origin of X is shifted to points on the aspherical surface located on the side of the outermost circumference corresponding to a lens effective diameter.

As seen from the above description, in the objective lens of Example 2, sufficient corrections are made of the aberrations for an oblique light beam, not to mention the on-axis aberrations. The objective lens of Example 2 is also suitable for a case of correcting coma aberration caused by inclination of an optical disk by inclining only the objective lens rather than the entire optical head.

A single lens can provide high productivity and high accuracy when it is manufactured by deforming (shaping) a lens material by a die. A desired shape of the die can be obtained by cutting a target block with a diamond cutting tool while rotating it about the optical axis. The diamond cutting tool produces an aspherical shape by moving it in the radial direction from the optical axis toward the outer circumference side or from the outer circumference side to the optical axis and, at the same time, moving it in the direction that is parallel with the optical axis. It is desirable to move the cutting tool without reversing the moving direction halfway in each of the radial direction and the direction that is parallel with the optical axis. This is because if the moving direction is reversed, a feed error is caused by what is called a backlash (i.e., a gap in a movement direction between mechanical elements such as a feed screw and a gear that make motions being fitted in/with each other; whereas absent the gap the gears interfere with each other and are rendered unable to rotate, the gap may cause dimensional deviation or impact when the rotation direction is reversed from a certain direction). Thus, the feature that sag amount always varies in the same direction as the position goes from the optical axis toward the lens outer circumference (lens outer edge) as in Example 1 and Example 2 provides a remarkable advantage that a highly accurate shape can be realized without producing errors.

Referential Example 1

Specific numerical values of an objective lens of Referential Example 1 are as follows. This is a design example in which the refractive index n of a lens material was set even larger than in Example 2. Designing was performed setting the refractive index n at 1.720000. As in the Example, a single lens having a numerical aperture NA=0.92 and a working distance Wd=0.2603 was designed. Likewise, the focal length f=1.300 was approximately the same.

f=1.300
NA=0.92
R1=1.024459
R2=−2.579919
d=1.863167
n=1.720000
Wd=0.2603
K1=−0.585802
$A_{1,4}$=0.028877709
$A_{1,6}$=−0.05899921
$A_{1,8}$=0.29117644
$A_{1,10}$=−0.5766808
$A_{1,12}$=0.38681897
$A_{1,14}$=0.48122367
$A_{1,16}$=−0.94440282
$A_{1,18}$=0.3926264
$A_{1,20}$=−0.034697825
$A_{1,22}$=0.3565036
$A_{1,24}$=−0.31484578
$A_{1,26}$=−0.1407322
$A_{1,28}$=0.24733906
$A_{1,30}$=−0.083343932
$A_{1,32}$=0.0054445552
$A_{1,34}$=−0.00035259087
$A_{1,36}$=−0.00037446607
$A_{1,38}$=−0.00015222256
$A_{1,40}$=0.00027476454
K2=−95.00379
$A_{2,4}$=1.4442607
$A_{2,6}$=−9.0856317
$A_{2,8}$=32.335139
$A_{2,10}$=−71.472763
$A_{2,12}$=77.810621
$A_{2,14}$=26.855803
$A_{2,16}$=−196.36443
$A_{2,18}$=232.95167
$A_{2,20}$=−96.985826
$A_{2,22}$=−1.5722635
$A_{2,24}$=−12.445859
$A_{2,26}$=17.498444
$A_{2,28}$=2.3337752
$A_{2,30}$=2.9579413
$A_{2,32}$=−6.6579158
$A_{2,34}$=−1.8786513
$A_{2,36}$=−1.6977991
$A_{2,38}$=−2.6994291
$A_{2,40}$=9.0711995

Also in Referential Example 1, the wavefront aberration falls within 11 mλ (λ: wavelength) in terms of the PV value and within 2.4 mλ in terms of the rms value of total aberration, which is a very good aberration characteristic. The off-axis characteristics, the angle-of-view characteristic, and the lens inclination characteristics of Referential Example 1 are equivalent to those of Example 1 though the former are not shown in any drawings.

In Referential Example 1, sufficient corrections are made of the aberrations for an oblique light beam, not to mention the on-axis aberrations. Referential Example 1 is also suitable for a case of correcting coma aberration caused by inclination of an optical disk by inclining only the objective lens rather than the entire optical head.

FIG. 6 is a diagram showing a sag shape of the second surface of the objective lens. In FIG. 6, the bottom side corresponds to a lens constituent material such as glass and the top side corresponds to air. In the second surface of the objective lens of Referential Example 1, the sag amount varies in such a manner as to decrease as the position goes from the optical axis toward the outer circumferential side of the lens and to change the tendency to increase around a position that is distant from the center by 0.4 mm. In other words, the sign of the differential coefficient of the sag amount with respect to the radial position is reversed in a partial radial position range. To obtain such a shape, the movement direction needs to be reversed halfway during working for production of a die. This raises a problem that a backlash causes a feed error and hence it becomes difficult to perform high-accuracy working. If the NA were equal to about 0.85, it would be possible to shape glass according to a die shape even if the intended shape is recessed partially or has a large curvature variation as in this Referential Example. However, it is difficult to shape an objective lens whose NA is as large as 0.91 or more because of higher difficulty of shaping due to, for example, a large inclination of the surface. That is, setting the refractive index of a lens material larger than or equal to 1.72 is disadvantageous in realizing an objective lens having a large NA value that is given a high-accuracy aspherical surface shape and is small in aberrations; it is desirable that n be smaller than 1.72.

Example 3

Specific numerical values of an objective lens of Example 3 are as follows. Example 3 is a design example in which the refractive index n of a lens material was set even smaller than in Example 1. Designing was performed setting the refractive index n at 1.610000. As in Examples 1 and 2, a single lens having a numerical aperture NA=0.92 and a working distance Wd=0.2603 was designed. Likewise, the focal length f=1.305 was approximately the same.

f=1.305
NA=0.92
R1=0.9370816

R2=−1.25738
d=1.885516
n=1.610000
Wd=0.2603
K1=−0.6115083
A1,4=0.03238076
A1,6=−0.05645141
A1,8=0.29574459
A1,10=−0.57944289
A1,12=0.39044441
A1,14=0.48349108
A1,16=−0.94483544
A1,18=0.39086313
A1,20=−0.035512351
A1,22=0.35738559
A1,24=−0.3143863
A1,26=−0.14031996
A1,28=0.24745013
A1,30=−0.083717561
A1,32=0.0049186126
A1,34=−0.00017253649
A1,36=−0.00019351854
A1,38=−6.8308307e-05
A1,40=0.00017672193
K2=−30.57304
A2,4=1.573592
A2,6=−9.176123
A2,8=32.357336
A2,10=−71.415156
A2,12=77.538725
A2,14=26.809091
A2,16=−196.65894
A2,18=233.61675
A2,20=−93.949162
A2,22=−3.9052453
A2,24=−15.495289
A2,26=16.060141
A2,28=2.6291159
A2,30=5.6093585
A2,32=−1.8042748
A2,34=0.65037455
A2,36=−3.2017711
A2,38=−8.7330391
A2,40=7.5649305

Also in Example 3, the wavefront aberration falls within 9 mλ (λ: wavelength) in terms of the PV value and within 2.2 mλ in terms of the rms value of total aberration, which is a very good aberration characteristic. The off-axis characteristics, the angle-of-view characteristic, and the lens inclination characteristics of this Example are equivalent to those of Example 1 though the former are not shown in any drawings.

FIG. 7 is a diagram showing a sag shape of the first surface of the objective lens of Example 3. In FIG. 7, the top side corresponds to a lens constituent material such as glass and the bottom side corresponds to air. In the first surface, the sag amount varies in such a manner as to always decrease as the position goes from the optical axis to the outer circumferential side of the lens. In other words, the differential coefficient of the sag amount with respect to the radial position is always positive, that is, the distance from the second surface always decreases with the radial position. The above Examples have the same characteristic though no reference was made to it. The inclination angle with respect to the horizontal direction is steepest around the outer edge. This angle depends on the refractive index of a lens material. In this Example, the inclination of the steepest portion is 65°.

In Example 3, sufficient corrections are made of the aberrations for an oblique light beam, not to mention the on-axis aberrations. Example 3 is also suitable for a case of correcting coma aberration caused by inclination of an optical disk by inclining the objective lens instead of the entire optical head. Since the refractive index is set small, the inclination angle of the steepest portion of the first surface is 65°. An inclination angle range to 65° is within such a range that glass shaping can be performed in an industrial sense by producing a die by working.

Referential Example 2

Specific numerical values of an objective lens of Referential Example 2 are as follows. Referential Example 2 is a design example in which the refractive index of a lens material was set even smaller than in Example 3. Designing was performed setting the refractive index n at 1.550000. As in Examples 1 to 3, a single lens having a numerical aperture NA=0.92 and a working distance Wd=0.2603 was designed. Likewise, the focal length f=1.279 was approximately the same.

f=1.279
NA=0.92
R1=0.8871618
R2=−0.8238803
d=1.894517
n=1.55000
Wd=0.2603
K1=−0.5997363
A1,4=0.034157734
A1,6=−0.051896354
A1,8=0.2906967
A1,10=−0.57513123
A1,12=0.39356189
A1,14=0.48504407
A1,16=−0.94741151
A1,18=0.39007096
A1,20=−0.035683909
A1,22=0.35805103
A1,24=−0.31388298
A1,26=−0.14003114
A1,28=0.24768306
A1,30=−0.084160737
A1,32=0.0045407282
A1,34=−3.253798e-05
A1,36=−6.6231839e-05
A1,38=−1.2134881e-05
A1,40=0.0001139315
K2=−26.23391
A2,4=1.5285423
A2,6=−9.0146929
A2,8=32.379133
A2,10=−71.535564
A2,12=77.430565
A2,14=26.80827
A2,16=−196.58835
A2,18=233.73766
A2,20=−94.008362
A2,22=−3.74137
A2,24=−15.454934
A2,26=15.918963
A2,28=2.398242
A2,30=5.4239064
A2,32=−1.9325894
A2,34=0.97340243
A2,36=−2.7019492

A2,38=−8.5654022
A2,40=7.0259232

Also in Referential Example 2, the wavefront aberration falls within 10 mλ (λ: wavelength) in terms of the PV value and within 2.6 mλ in terms of the rms value of total aberration, which is a very good aberration characteristic. The off-axis characteristics, the angle-of-view characteristic, and the lens inclination characteristics of this Example are equivalent to those of the above Example 1 though the former are not shown in any drawings.

Although the sag shape of the first surface is approximately equivalent to that of each of the above Examples etc., because of the small refractive index 1.55 the inclination angle with respect to the horizontal direction is steeper than in Example 3. The inclination angle of a steepest portion around the outer edge is 69.5°.

In Referential Example 2, sufficient corrections are made of the aberrations for an oblique light beam, not to mention the on-axis aberrations. Referential Example 2 is also suitable for a case of correcting coma aberration caused by inclination of an optical disk by inclining only the objective lens rather than the entire optical head. Since the refractive index is set even smaller, the inclination angle of the steepest portion of the first surface is 69.5°. Although it may be possible to perform glass shaping by producing a die by working, the difficulty of production of a die by working, shaping, and a measurement for a test will be high. Although Referential Example 2 would be within a range that industrial manufacture is possible, the difference from Example 3 having the maximum inclination angle 65° in terms of difficulty of manufacture is very large and hence it should be said that Referential Example 2 is not a preferable option. It can therefore be said that n≥1.61 is desirable.

Referential Example 3

Specific numerical values of an objective lens of Referential Example 3 are as follows. Referential Example 3 is a design example in which the refractive index of a lens material was set even smaller than in Referential Example 2. Designing was performed setting the refractive index n at 1.530000. As in Examples 1 to 3 and Referential Example 2, a single lens having a numerical aperture NA=0.92 and a working distance Wd=0.2603 was designed. Likewise, the focal length f=1.267 was approximately the same.

f=1.267
NA=0.92
R1=0.8701568
R2=−0.7201186
d=1.897722
n=1.53000
Wd=0.2603
K1=−0.6025831
A1,4=0.037880108
A1,6=−0.053375389
A1,8=0.29304522
A1,10=−0.57380243
A1,12=0.39372847
A1,14=0.48480237
A1,16=−0.94747382
A1,18=0.39007241
A1,20=−0.035536206
A1,22=0.35821444
A1,24=−0.31377187
A1,26=−0.13999922
A1,28=0.24767419
A1,30=−0.084189393
A1,32=0.0044520017
A1,34=−3.9907993e-05
A1,36=−5.0456806e-05
A1,38=−1.6054911e-06
A1,40=0.00012099685
K2=−23.93713
A2,4=1.5254234
A2,6=−8.9955371
A2,8=32.397843
A2,10=−71.521522
A2,12=77.426845
A2,14=26.793815
A2,16=−196.61374
A2,18=233.72653
A2,20=−94.008202
A2,22=−3.7437718
A2,24=−15.438
A2,26=15.943162
A2,28=2.4384296
A2,30=5.4282742
A2,32=−1.93986
A2,34=0.95015203
A2,36=−2.7734284
A2,38=−8.6145005
A2,40=7.1179099

Also in Referential Example 3, the wavefront aberration falls within 10 mλ (λ: wavelength) in terms of the PV value and within 2.8 mλ in terms of the rms value of total aberration, which is a very good aberration characteristic. The off-axis characteristics, the angle-of-view characteristic, and the lens inclination characteristics of this Referential Example are equivalent to those of Example 1 though the former are not shown in any drawings.

Since the refractive index is as small as 1.53, the sag shape of the first surface of the objective lens of Referential Example 3 is such that the inclination angle with respect to the horizontal direction is even steeper than in Referential Example 2. The inclination angle of a steepest portion around the outer edge is 71.6°.

In Referential Example 3, sufficient corrections are made of the aberrations for an oblique light beam, not to mention the on-axis aberrations. Referential Example 3 is also suitable for a case of correcting coma aberration caused by inclination of an optical disk by inclining only the objective lens rather than the entire optical head. However, since the refractive index is set even smaller, the inclination angle of the steepest portion of the first surface is 71.6°, that is, larger than 70°. Production of a die by working, glass shaping, and a measurement for a test will be difficult. Based on Example 3 and Referential Examples 2 and 3, it is desirable that the refractive index n of a glass material be larger than or equal to 1.61

Example 4

Specific numerical values of an objective lens of Example 4 are as follows. Example 4 is an example in which a single lens having a focal length f=1.095, a numerical aperture NA=0.92, and a working distance Wd=0.227 was designed with the refractive index n of a lens material being equal to 1.6239179286.

f=1.095
NA=0.92
R1=0.7976014
R2=−1.159809
d=1.571839
n=1.6239179286

Wd=0.227
K1=−0.5995013
A1,4=0.048732638
A1,6=−0.083099251
A1,8=0.60556523
A1,10=−1.5012196
A1,12=1.3269474
A1,14=2.008697
A1,16=−5.1298791
A1,18=2.7142693
A1,20=−0.22337017
A1,22=3.8248011
A1,24=−4.2754736
A1,26=−2.4272268
A1,28=5.1478273
A1,30=−2.1882933
A1,32=0.21845392
A1,34=0.056599416
A1,36=0.0094328176
A1,38=−0.011086886
A1,40=−0.053664515
K2=−36.76408
A2,4=2.2045114
A2,6=−16.260526
A2,8=71.238827
A2,10=−197.2256
A2,12=269.57208
A2,14=116.16759
A2,16=−1071.1173
A2,18=1590.1162
A2,20=−804.11863
A2,22=−39.868862
A2,24=−185.88804
A2,26=280.31798
A2,28=13.182275
A2,30=37.295733
A2,32=60.707292
A2,34=259.19454
A2,36=−230.43116
A2,38=−1245.5184
A2,40=1179.7888

FIG. 8 is a diagram showing the wavefront aberration of Example 4. The aberration falls within 9 mλ (λ: wavelength) in terms of the PV value and within 2.1 mλ in terms of the rms value of total aberration, which is a very good aberration characteristic.

FIG. 9 is a diagram showing the off-axis characteristics of Example 4. Total aberration is within 30 mλrms at an angle of view 0.6°, which raises no practical problems.

FIG. 10 is a diagram showing how the wavefront aberration varies when only the objective lens is inclined, that is, the lens inclination characteristics of the objective lens. Astigmatism that occurs when coma aberration caused by inclination of an optical disk is canceled by inclining the objective lens is within 10 mλ if the comma aberration is smaller than about 60 mλ.

Aberration calculation were performed with assumptions that the base material thickness from the optical disk surface to the recording surface was 0.0805 mm, the refractive index of the base material was 1.6173566451, and light incident on the objective lens is slightly convergent light for the purpose of minimizing third order spherical aberration in a state of no inclination.

Sufficient corrections are made of the aberrations for an oblique light beam, not to mention the on-axis aberrations. Example 4 is also suitable for a case of correcting coma aberration caused by inclination of an optical disk by inclining the objective lens instead of the entire optical head.

Example 5

Specific numerical values of an objective lens of Example 5 are as follows. Example 5 is a design example in which the refractive index of a lens material was set larger than in Example 4. Designing was performed setting the refractive index n at 1.710000. As in Example 4, a single lens having a numerical aperture NA=0.92 and a working distance Wd=0.227 was designed. Likewise, the focal length f=1.087 was approximately the same as in Example 4.

f=1.087
NA=0.92
R1=0.8513452
R2=−2.119132
d=1.524259
n=1.710000
Wd=0.227
K1=−0.5701376
A1,4=0.042260149
A1,6=−0.07932301
A1,8=0.57083044
A1,10=−1.4704232
A1,12=1.3326274
A1,14=1.9444891
A1,16=−5.1332246
A1,18=2.7557259
A1,20=−0.19163368
A1,22=3.8093947
A1,24=−4.3164684
A1,26=−2.4641984
A1,28=5.1464247
A1,30=−2.1407528
A1,32=0.32417317
A1,34=0.0095500902
A1,36=−0.07359415
A1,38=−0.046286902
A1,40=0.018501072
K2=−100.6944
A2,4=1.9970787
A2,6=−15.951707
A2,8=71.306374
A2,10=−197.64632
A2,12=269.06685
A2,14=117.2912
A2,16=−1068.257
A2,18=1589.7713
A2,20=−810.36217
A2,22=77.377546
A2,24=−155.59292
A2,26=322.96653
A2,28=213.94157
A2,30=3.5083828
A2,32=−580.64201
A2,34=−128.08005
A2,36=306.25724
A2,38=724.43336
A2,40=−495.05964

Also in Example 5, the wavefront aberration falls within 7 mλ (λ: wavelength) in terms of the PV value and within 2 mλ in terms of the rms value of total aberration, which is a very good aberration characteristic. The off-axis characteristics, the angle-of-view characteristic, and the lens inclination characteristics of Example 5 are equivalent to those of Example 1 though the former are not shown in any drawings.

FIG. 11 is a diagram showing a sag shape of the second surface of the objective lens. In FIG. 11, the bottom side corresponds to a lens constituent material such as glass and the top side corresponds to air. In the second surface of the objective lens used in Example 5, the sag amount varies in such a manner as to always decrease as the position goes from the optical axis to the outer circumferential side. In other words, the differential coefficient of the sag amount with respect to the radial position is always negative, that is, the distance from the first surface always decreases with the radial position. Example 4 described above has the same characteristic though no reference was made to it.

In Example 5, sufficient corrections are made of the aberrations for an oblique light beam, not to mention the on-axis aberrations. Example 5 is also suitable for a case of correcting coma aberration caused by inclination of an optical disk by inclining only the objective lens rather than the entire optical head.

In the second surface of the objective lens of Example 5, the sag amount varies in such a manner as to always decrease as the position goes from the optical axis to the outer circumferential side. In other words, the differential coefficient of the sag amount with respect to the radial position is always negative, that is, the distance from the first surface always decreases with the radial position. Example 4 has the same characteristic though no reference was made to it. As described above in Example 2, the feature that the sag amount always varies in the same direction as the position goes from the optical axis to the lens outer circumferential side as in Examples 4 and 5 provides a remarkable advantage that a highly accurate shape can be realized without producing errors.

Referential Example 4

Specific numerical values of an objective lens of Referential Example 4 are as follows. Referential Example 4 is a design example in which the refractive index of a lens material was set even larger than in Example 5. Designing was performed setting the refractive index n at 1.720000. As in Examples 4 and 5, a single lens having a numerical aperture NA=0.92 and a working distance Wd=0.236 was designed. Likewise, the focal length f=1.084 was approximately the same as in Examples 4 and 5.

f=1.084
NA=0.92
R1=0.8533957
R2=−2.431396
d=1.497296
n=1.720000
Wd=0.236
K1=−0.5623167
A1,4=0.041873955
A1,6=−0.078487103
A1,8=0.57035292
A1,10=−1.469524
A1,12=1.3311124
A1,14=1.9451143
A1,16=−5.1357862
A1,18=2.7591604
A1,20=−0.1913136
A1,22=3.8033139
A1,24=−4.3107475
A1,26=−2.4651919
A1,28=5.1461636
A1,30=−2.1422117
A1,32=0.327606
A1,34=0.0083325205
A1,36=−0.074993046
A1,38=−0.04497432
A1,40=0.01756398
K2=−124.7254
A2,4=2.006511
A2,6=−15.920383
A2,8=71.268236
A2,10=−197.74098
A2,12=268.96006
A2,14=117.30896
A2,16=−1067.7616
A2,18=1590.8539
A2,20=−806.40392
A2,22=−88.892721
A2,24=−156.0547
A2,26=320.82989
A2,28=212.15027
A2,30=8.8926951
A2,32=−535.69858
A2,34=−57.395299
A2,36=273.49988
A2,38=491.48637
A2,40=−412.33933

Also in Referential Example 4, the wavefront aberration falls within 7 mλ (λ: wavelength) in terms of the PV value and within 1.5 mλ in terms of the rms value of total aberration, which is a very good aberration characteristic. The off-axis characteristics, the angle-of-view characteristic, and the lens inclination characteristics of this Example are equivalent to those of Example 1 though the former are not shown in any drawings.

FIG. 12 is a diagram showing a sag shape of the second surface of the objective lens of Referential Example 4. In FIG. 12, the bottom side corresponds to a lens constituent material such as glass and the top side corresponds to air. In the second surface of this Example, the sag amount varies in such a manner as to decrease as the position goes from the optical axis toward the outer circumferential side of the lens and to change the tendency to increase around a position that is distant from the center by 0.4 mm. In other words, the sign of the differential coefficient of the sag amount with respect to the radial position is reversed in a partial radial position range.

In Referential Example 4, sufficient corrections are made of the aberrations for an oblique light beam, not to mention the on-axis aberrations. Referential Example 4 is also suitable for a case of correcting coma aberration caused by inclination of an optical disk by inclining only the objective lens rather than the entire optical head.

However, in the second surface of the objective lens of Referential Example 4, the sag amount varies in such a manner as to decrease as the position goes from the optical axis toward the outer circumferential side of the lens and to change the tendency to increase around a position that is distant from the center by 0.34 mm. In other words, the sign of the differential coefficient of the sag amount with respect to the radial position is reversed in a partial radial position range. To obtain such a shape, the movement direction needs to be reversed halfway during working for production of a die. This raises a problem that a backlash causes a feed error and hence it becomes difficult to perform high-accuracy working. That is, setting the refractive index of a lens material larger than or equal to 1.72 is disadvantageous in realizing an objective lens having a large NA value that is given a high-accuracy aspherical surface shape and is small in aberrations; it is desirable that n be smaller than 1.72.

The objective lens according to the invention has a large numerical aperture (NA) value that is larger than or equal to 0.91 and can provide characteristics corresponding to a diffraction limit that allow itself to be used as an objective lens of an optical disk, though it is a single lens. Sufficient corrections are made of the aberrations for an oblique light beam, not to mention the on-axis aberrations.

Furthermore, the objective lens according to the invention is also suitable for a case of correcting coma aberration caused by inclination of an optical disk by inclining only the objective lens rather than the entire optical head. That is, the objective lens according to the invention can reduce the lens inclination for correcting coma error caused by inclination of an optical disk by adding an optimum amount of coma error in an off-axis portion and can reduce the total aberration in correcting coma aberration in an optical pickup optical system for an optical disk.

The proper refractive index range described in this embodiment is a feature that has become apparent by increasing the NA of a single lens to 0.91 or more.

In incorporating an objective lens in an optical pickup, it is possible to dispose, in the vicinity of its first surface, an aperture for restricting the diameter of an optical beam to shine on the objective lens. The aperture makes it possible to prevent a problem that light incident on a portion outside a design region of the objective lens produces large aberrations to deteriorate the converging performance. However, to secure an allowance for a deviation between the center axes of the aperture and the objective lens, it is desirable to set the diameter of the aperture smaller than the full effective radius of the objective lens. To secure an allowance of about 10 μm for axial misalignment in an objective lens having a focal length of about 1 mm, a proper approach would be to set the radius of the aperture so that the NA becomes equal to 0.91. This supports the statement that the NA of the objective lens according to Examples should be larger than or equal to 0.91.

Embodiment 2

FIG. 13 is a diagram showing the configuration of an optical head device 1300 according to a second embodiment. As shown in FIG. 13, the optical head device 1300 is equipped with a laser light source 1301, a relay lens 1302, a beam splitter 1303, a collimating lens (first convex lens) 1304, a raising mirror 1305, a quarter-wave plate 1306, an objective lens 100, a drive means 1307, a diffraction element 1308, a detection lens 1309, a first optical detector 1310, a condenser lens 1311, and a second optical detector 1312. An optical disk 101 has a base material thickness t1 that is equal to about 0.1 mm (a base material thickness that is smaller than or equal to 0.11 mm when manufacturing errors are taken into consideration is referred to as "about 0.1 mm") or smaller and recording or reproduction is performed on or from it using a light beam having a wavelength λ1. The laser light source 1301 (first light source) emits a blue light beam 107 having the wavelength λ1 (390 to 415 nm; a standard wavelength is about 405 nm). As shown in FIG. 1, to increase mechanical strength, the optical disk 101 is formed by bonding a base material layer 105 (from light incidence surface to recording surface) to a substrate 104 of about 1.1 mm in thickness, whereby an external dimension of about 1.2 mm is obtained. In the drawings to be referred to below to describe the invention, a protective member will be omitted for the purpose of simplification.

The laser light source 1301 should preferably be a semiconductor laser light source, in which case the optical head device and an optical information device using it can be reduced in size, weight, and power consumption.

When recording or reproduction is performed on or from the optical disk 101, a light beam 107 having the wavelength λ1 passes through the relay lens 1302, is reflected by the beam splitter 1303, is converted into approximately parallel light by the collimating lens 1304, is bent (the optical axis is bent) by the raising mirror 1305, and is converted into circularly polarized light by the quarter-wave plate 1306. The light is focused on an information recording surface 106 through the base material layer (thickness: about 0.1 mm) of the optical disk 101 by the objective lens 100. The efficiency of light utilization of the laser light source 1301 and the far field pattern can be made preferable by the relay lens 1302; however, the relay lens 1302 may be omitted if such a measure is not necessary. Although for the sake of convenience of drawing the figure the raising mirror 1305 is shown so as to bend the light beam upward in the figure, in actuality a configuration is employed in which the light beam optical axis is bent perpendicularly to the figure to the viewer's side (or the deep side). The optical path described so far is referred to as a "forward path."

After being reflected by the information recording surface, the light beam 107 goes along part of the previous path (now a reverse path) in the reverse direction. The light beam 107 is converted into a linearly polarized light by the quarter-wave plate 1306 that is polarized perpendicularly to the original polarization direction, passes through the beam splitter 1303 almost fully, is increased in focal length by the detection lens 1309, and shines on the first optical detector 1310 which serves as a photodetecting unit. Servo signals to be used for focusing control and tracking control and an information signal are obtained by performing calculations on output electrical signals of the first optical detector 1310. Highly accurate and stable servo signal detection can be realized by disposing the diffraction element 1308 in the reverse path. As described above, the beam splitter 1303 has a polarizing separation film that fully reflects a linearly polarized component, polarized in one direction, of the light beam 107 having the wavelength λ1 and fully transmits a linearly polarized component polarized perpendicularly to the former. Depending on the use of the optical head device 1300 (e.g., a device dedicated to reproduction), the beam splitter 1303 can be one without polarization dependence and the quarter-wave plate 1306 can be omitted.

Since the objective lens 100 is the objective lens according to the first embodiment and its surface shapes can be formed with high accuracy though its NA is larger than 0.9, the optical head device 1300 provides an advantage that it enables high-resolution, high-density information recording and reproduction. The objective lens 100 focuses a light beam 107 and thereby forms a small spot on the recording surface of the optical disk 101. A focused beam spot of the light beam 107 is formed by driving the objective lens 100 in the optical axis direction by means of the drive means 1307 which is an example actuator.

It is also effective to change the parallelism of the light beam by moving the collimating lens 1304 in the optical axis direction (left-right direction in FIG. 13). Spherical aberration occurs if there exists a thickness error of the base material layer or a base material thickness component resulting from an interlayer thickness (in the case of a double layer disk). Such spherical aberration can be corrected by moving the collimating lens 1304 in the optical axis direction as mentioned above. Spherical aberration due to a base material thickness component of ±30 µm or more can be corrected by moving the collimating lens 1304.

Furthermore, where the beam splitter 1303 is formed so as to transmit part (e.g., about 10%) of linearly polarized light emitted from the laser light source 1301 and a transmitted light beam 107 is guided to the second optical detector 1312 by the condenser lens 1311, it becomes possible to monitor a variation of the emission light quantity of the light beam 107 using a signal obtained from the second optical detector 1312 and to perform a control of keeping the emission light quantity of the light beam 107 by feeding back the light quantity variation.

Embodiment 3

FIG. 14 is a diagram showing the configuration of an optical information device 1400 according to a third embodiment. As shown in FIG. 14, the optical information device 1400 is equipped with an optical head device 1300, a drive device 1401, an electric circuit 1402, a motor 1403, a turn table 1404, and a clamper 1405. The optical head device 1300 is the one described in the second embodiment.

The optical disk 101 is rotated by the motor 1403 in a state that it is mounted on the turn table 1404 and fixed by the clamper 1405. The optical head device 1300 is moved roughly by the drive device 1401 to tracks, bearing desired information, of the optical disk 101.

The optical head device 1300 sends, to the electric circuit 1402, a focusing error signal and tracking error signals that depend on its positional relationship with the optical disk 101. The electric circuit 1402 sends, to the optical head device 1300, signals to be used for moving the objective lens 100 slightly according to the received signals. The optical head device 1300 performs a focusing control and a tracking control on the optical disk 101 on the basis of these signals, and reads, writes (records), or erases information.

Using, as the optical head device, the optical head device 1300 described in the second embodiment, the optical information device 1400 according to this embodiment provides an advantage that it can accommodate optical disks that are high in recording density.

Embodiment 4

Capable of performing recording or reproduction on or from different kinds of optical disks stably, a computer, an optical disk player, an optical disk recorder, a server, a vehicle, or the like that is equipped with the optical information device 1400 described in the third embodiment or employs the above-described recording/reproduction method provides an advantage that it can be used for a variety of uses. Since these kinds of equipment have in common a feature of reproducing information from an optical disk using an optical head device, all of them can be referred to generically an "optical disk system."

FIG. 15 is a diagram showing the configuration of an optical disk system 1500 according to a fourth embodiment. The optical disk system 1500 is equipped with the optical information device 1400 according to the third embodiment and a computing device 1501. The optical disk system 1500 is equipped with an input terminal to which an input device 1502 is connected and an output terminal to which an output apparatus 1503 is connected. The input device 1502 serves for input of information. Examples of the input device 1502 are a keyboard, a mouse, and a touch panel. The computing device 1501 performs computation on the basis of information received from the input device 1502, information read out from the optical information device 1400, and other information. An example of the computing device 1501 is a central processing unit (CPU). The output apparatus 1503 displays information such as a result of computation performed by the computing device 1501. Example of the output apparatus 1503 are a CRT, a liquid crystal display apparatus, and a printer.

Employing the optical head device according to the third embodiment as the optical head device, the optical disk system according to this embodiment provides an advantage that it can accommodate optical disks that are high in recording density.

Incidentally, the computing device 1501 may be a conversion device as an example information-to-image decoder for converting an information signal acquired from the optical information device 1400 into an image including a still image and a moving image. The computing device 1501 may be a conversion device as an example image-to-information encoder for converting image information of an image including a still image and a moving image into information to be recorded by the optical information device 1400. Furthermore, the computing device 1501 may be a conversion device capable of converting an information signal received from the optical information device 1400 into an image including a still image and a moving image and converting image information of an image including a still image and a moving image into information to be recorded by the optical information device 1400. The input device 1502 and the output apparatus 1503 may be integrated with the optical disk system 1500.

Embodiment 5

FIG. 16 is a diagram showing the configuration of an optical disk system 1600 according to a fifth embodiment. The optical disk system 1600 is configured in such a manner that input/output terminal 1601 is added to the optical disk system 1500 according to the third embodiment. The input/output terminal 1601 is a wired or wireless communication terminal for taking in information to be recorded in the optical disk system 1600 or outputting information read out by the optical information device 1400 to an external network 1602. Configured in this manner, the optical disk system 1600 can exchange information with a network, that is, plural apparatus such as computers, telephones, and TV tuners and can be used as a shared information server by those plural apparatus. Capable of performing recording or reproduction on or from different kinds of optical disks stably, the optical information device employed in the fifth embodiment provides an advantage that it can be used for a variety of uses. The optical disk system 1600 may be equipped with an output apparatus 1503 for displaying information, such as a CRT, a liquid crystal display apparatus, or a printer.

Where a changer for inputting and outputting one of plural optical disks to and from the optical information device 1400 is provided additionally, an advantage can be provided that more information can be recorded or accumulated and hence the optical disk system 1500 can be used suitably as an information storage apparatus in a data center.

Since the optical information device employed in this embodiment uses the above-described optical head device according to the invention as the optical head device, the optical disk system provides an advantage that it can accommodate optical disks that are high in recording density.

Although each of the fourth and fifth embodiments employs the output apparatus 1503 shown in FIG. 15 or 16, it goes without saying that a product form is possible in which an output terminal is not provided and the output device 1503 is not provided (sold separately). Conversely, in each of the fourth and fifth embodiments, a product form is possible in which the input device is sold separately and only an input terminal is provided.

The present application is based on Japanese Patent Application No. 2018-224311 filed on Nov. 30, 2018, the disclosure of which is invoked herein by reference.

INDUSTRIAL APPLICABILITY

The optical head device according to the invention can perform recording and reproduction on plural kinds of optical disks that are different from each other in base material thickness, compatible wavelength, recording density, etc., and a compatible optical information device using this optical head device can deal with optical disks that comply with a number of standards such as the CD, DVD, and BD. As such, the optical head device according to the invention can be applied extensively to all systems that store information, such as computers, optical disk players, optical disk recorders, car navigation systems, editing systems, data servers, AV components, and vehicles.

DESCRIPTION OF SYMBOLS

100: Objective lens
101: Optical disk
102: First surface
103: Second surface
104: Substrate
105: Base material layer
106: Information recording surface
107: Light beam
1300: Optical head device
1301: Laser light source
1302: Relay lens
1303: Beam splitter
1304: Collimating lens
1305: Raising mirror
1306: Quarter-wave plate
1307: Drive means
1308: Diffraction element
1309: Detection lens
1310: First optical detector
1311: Condenser lens
1312: Second optical detector
1400: Optical information device
1401: Drive device
1402: Electric circuit
1403: Motor
1404: Turn table
1405: Clamper
1500, 1600: Optical disk system
1501: Computing device
1502: Input device
1503: Output apparatus
1601: Input/output terminal
1602: External network

The invention claimed is:

1. An objective lens configured to receive a light beam having a wavelength $\lambda$ and to focus the light beam into a small spot on a recording surface of an optical disk to record and reproduce information,
wherein a range of the wavelength $\lambda$ is from 390 nm to 415 nm;
wherein the objective lens is a single lens having a numerical aperture NA and a refractive index n with respect to the focused light beam;
wherein the numerical aperture NA satisfies NA≥0.91 and the refractive index n satisfies $1.61 \leq n < 1.72$; and
wherein the objective lens is a biconvex lens, a sag amount of each surface of which always varies in a same direction from an optical axis toward a lens outer circumference of the biconvex lens.

2. The objective lens according to claim 1, wherein a focal length f of the objective lens falls in a range of 1 to 1.3 mm.

3. The objective lens according to claim 1, wherein a working distance Wd of the objective lens falls in a range of 0.2 to 0.3 mm.

4. The objective lens according to claim 1, wherein NA≤0.94 is satisfied.

5. An optical head device comprising:
a laser light source configured to emit a light beam;
the objective lens according to claim 1 configured to receive the light beam emitted from the laser light source and to focus the light beam into the small spot on the recording surface of the optical disk; and
an optical detector formed of a photodetecting unit configured to receive a light beam reflected from the recording surface of the optical disk and to output an electrical signal according to a light quantity of the received light beam.

6. An optical information device comprising:
the optical head device according to claim 5;
a motor configured to rotate the optical disk; and
an electric circuit configured to receive a signal produced by the optical head device and to control and drive the motor, the objective lens, and the laser light source.

7. An optical information device comprising:
an optical head device;
a motor configured to rotate an optical disk; and
an electric circuit configured to receive a signal produced by the optical head device and to control and drive the motor, an objective lens and a laser light source of the optical head device,
wherein the optical head device comprises:
a first light source configured to emit a blue light beam having a wavelength $\lambda 1$;
the objective lens according to claim 1 configured to receive the blue light beam emitted from the first light source and to focus the blue light beam into the small spot on the recording surface of the optical disk through a base material layer having a base material thickness t1;
an optical detector formed of a photodetecting unit configured to receive a light beam reflected from the recording surface of the optical disk and to output an electrical signal according to a light quantity of the received light beam; and
an actuator configured to perform focusing so that the small spot is formed on the recording surface of the optical disk by driving the objective lens in an optical axis direction of the objective lens;
wherein the optical head device is configured to detect, from the optical detector, an electrical signal for detection of a focusing error signal; and
wherein the optical head device is configured to perform focusing so that the small spot is formed on the recording surface of the optical disk by driving the objective lens in the optical axis direction of the objective lens by the actuator.

8. An optical disk system comprising:
the optical information device according to claim 6;
an input device or an input terminal configured to input information;
a computing device configured to perform computation based on the information received from the input device or the input terminal, or information reproduced from the optical information device; and
an output apparatus or an output terminal configured to display or output the information received from the input device or the input terminal, the information reproduced from the optical information device, or a result of the computation by the computing device.

9. An optical disk system comprising:
the optical information device according to claim 6; and
an information-to-image decoder configured to convert an information signal acquired from the optical information device into an image.

10. An optical disk system comprising:
the optical information device according to claim 6; and
an image-to-information encoder configured to convert image information into information to be recorded by the optical information device.

11. An optical disk system comprising:
the optical information device according to claim 6; and
an input/output terminal for exchange of information with the outside.

12. An optical disk system comprising:
the optical information device according to claim 7;
an input device or an input terminal configured to input information;
a computing device configured to perform computation based on the information received from the input device or the input terminal, or information reproduced from the optical information device; and
an output apparatus or an output terminal configured to display or output the information received from the input device or the input terminal, the information reproduced from the optical information device, or a result of the computation by the computing device.

13. An optical disk system comprising:
the optical information device according to claim 7; and
an information-to-image decoder configured to convert an information signal acquired from the optical information device into an image.

14. An optical disk system comprising:
the optical information device according to claim 7; and
an image-to-information encoder configured to convert image information into information to be recorded by the optical information device.

15. An optical disk system comprising:
the optical information device according to claim 7; and
an input/output terminal for exchange of information with the outside.

* * * * *